United States Patent
Calow

(10) Patent No.: US 6,714,928 B1
(45) Date of Patent: Mar. 30, 2004

(54) DEVELOPMENT SYSTEM PROVIDING HTML DATABASE CONTROL OBJECT

(75) Inventor: Thomas Jeffrey Calow, Westford, MA (US)

(73) Assignee: Sybase, Inc., Dublin, CA (US)

( * ) Notice: Subject to any disclaimer, the term of this patent is extended or adjusted under 35 U.S.C. 154(b) by 0 days.

(21) Appl. No.: 09/527,983

(22) Filed: Mar. 17, 2000

Related U.S. Application Data

(60) Provisional application No. 60/125,102, filed on Mar. 19, 1999.

(51) Int. Cl.[7] .......................... G06F 17/30; G06F 15/00
(52) U.S. Cl. ............................................. 707/4; 715/513
(58) Field of Search ................................. 345/326, 333, 345/349–473; 707/501–513, 2, 4; 715/509, 513, 514

(56) References Cited

U.S. PATENT DOCUMENTS

| 5,121,477 A | 6/1992 | Koopmans et al. |
| 5,148,154 A | 9/1992 | MacKay et al. |
| 5,179,652 A | 1/1993 | Rozmanith et al. |
| 5,204,947 A | 4/1993 | Bernstein et al. |
| 5,293,615 A | 3/1994 | Amada |
| 5,367,619 A | 11/1994 | Diapaolo et al. |
| 5,396,587 A | 3/1995 | Reed et al. |
| 5,410,704 A | 4/1995 | Norder-Paul et al. |
| 5,566,330 A | 10/1996 | Sheffield |
| 5,594,899 A | 1/1997 | Knudsen et al. |
| 5,682,535 A | 10/1997 | Kundsen |
| 6,061,695 A * | 5/2000 | Slivka et al. ................ 707/513 |
| 6,249,291 B1 * | 6/2001 | Popp et al. .................. 345/473 |

* cited by examiner

*Primary Examiner*—Uyen Le
*Assistant Examiner*—Te Y Chen
(74) *Attorney, Agent, or Firm*—John A. Smart

(57) ABSTRACT

A Database Development System is described that provides methodologies for creating an HTML or Web database control object (the "HTML DataWindow") for use in a Client/Server Database System The HTML DataWindow serves as a thin-client DataWindow implementation for Web applications that provides most of the data manipulation, presentation, and scripting capabilities of the PowerBuilder DataWindow, without requiring any runtime DLLs (e.g., PowerBuilder runtime dynamic link libraries) on the client. DataWindow validation rules, formatting, and edit styles are automatically converted by the system into equivalent HTML and JavaScript, without coding by the user. HTML is generated that is suitable for the target browser. A plurality of functions and events are implemented by the generation of JavaScript which is downloaded to the client. In this manner, the Web or HTML DataWindow Design-Time Dontrol supports generation of a runtime DataWindow object in HTML.

27 Claims, 24 Drawing Sheets

FIG. 11A

Script for Clicked event of the cb_new CommandButton →

```
//////////////////////////////////////////////////////////////
//                                                           /
// To begin, check whether user did any typing in dw_detail. /
// DataWindow contr                                          /
// will be lost if                                           /
//                      //////////////////////////////////////////////////////////////
// We've coded a wi     //                                                           /
// wf_warndataloss)     //  If the user clicks the right mouse button while the      /
//                      //  pointer is on the window itself (but not on a control),  /
////////////////////////// then display a popup menu. The popup menu we want to      /
IF wf_warndataloss(     //  display for the Customer window consists of the m_guide  /
                        //  portion of the m_custmenu menu that we already display   /
    RETURN              //  in the window's menu bar.                                /
END IF                  //////////////////////////////////////////////////////////////
                        // First, determine the current position (x and y coordinates)
////////////////////////// of the pointer.
//
// Next, some init       integer li_x, li_y
//
//////////////////////////  li_x = PointerX ()
                            li_y = PointerY ()

// Now, display the m_guide menu as a popup menu at the current
         // Reset the   // pointer location.
         // disable i
dw_list.Reset()           m_custmenu.m_guide.PopMenu ( li_x, li_y )
dw_list.enabled = false
sle_lname.text = ""
                                       ↑
...                            Script for RButtonDown event of the w_customer window

// Display a modal (response) window that presents the
         // user with information about this application.

Open (w_about_ord)
                    ↓
         Script for Clicked event of the m_about menu item
```

FIG. 11A

```
// This script uses embedded SQL to find the highest Cust_Id
// currently stored in the database. It then adds 1 to that
// number to provide the Id for a new customer.

integer li_fetched_id = 0

SELECT Max("customer"."cust_id" )
    INTO :li_fetched_id
    FROM "customer"
    USING sqlca;

IF sqlca.sqlcode >= 0 THEN

IF IsNull(li_fetched_id) THEN
        li_fetched_id = 0
    END IF li_fetched_id ++

ELSE li_fetched_id = -1

END IF

...
```

EMBEDDED SQL STATEMENT (arrow points to SELECT block)

POWERSCRIPT STATEMENTS (bracket covers IF...END IF block)

FIG. 11C

```
// This function uses embedded SQL to see if the customer to
// be deleted has any orders in the database.  It takes one
// argument -- the customer's ID number.
//
//      Return values:
//      * If no orders, then 0
//      * If orders, then that number
//      * If error, then -1 integer li_fetched_count = 0

SELECT Count("order_header"."order_id")
    INTO :li_fetched_count
    FROM "order_header"
    WHERE "order_cust_id" = :ai_custid
        USING sqlca;

IF sqlca.sqlcode = -1 THEN li_fetched_count = -1

RETURN li_fetched_count
```

DEVELOPMENT SYSTEM PROVIDING HTML DATABASE CONTROL OBJECT

This application claims priority from provisional application serial No. 60/125,102, entitled DEVELOPMENT SYSTEM PROVIDING HTML DATABASE CONTROL OBJECT, filed Mar. 19, 1999, now abandoned, the disclosure of which is hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to information processing environments and, more particularly, to development and execution of database application programs which operate in a Web environment.

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee. Here, each record contains fields designating specifics about the employee, such as name, home address, salary, and the like.

Between the actual physical database itself (i.e., the records contained in data pages stored on a storage device) and the users of the system, a database management system or DBMS is typically provided as a software cushion or layer. In essence, the DBMS shields the database user from knowing or even caring about underlying hardware-level details. Typically, all requests from users for access to the data are processed by the DBMS. For example, information may be added or removed from data files, information retrieved from or updated in such files, and so forth, all without user knowledge of underlying system implementation. In this manner, the DBMS provides users with a conceptual view of the database that is removed from the hardware level. The general construction and operation of a database management system is known in the art. See e.g., Date, C., *An Introduction to Database Systems*, Volume I and II, Addison Wesley, 1990; the disclosure of which is hereby incorporated by reference.

DBMS systems have long since moved from a centralized mainframe environment to a de-centralized or distributed environment. One or more PC "client" systems, for instance, may be connected via a network to one or more server-based database systems (SQL database server). Commercial examples of these "client/server" systems include Powersoft™ clients connected to one or more Sybase SQL Server™ database servers. Both Powersoft™ and Sybase SQL Server™ are available from Sybase, Inc. of Emeryville, Calif. As the migration to client/server continues, each day more and more businesses are run from mission-critical systems which store information on server-based SQL database systems, such as Sybase SQL Server™. As a result, increasingly higher demands are being placed on server-based SQL database systems to provide enterprise-wide decision support—providing timely on-line access to critical business information (e.g., through "queries"). Accordingly, there is much interest in improving the performance of such systems, particularly in the area of database query performance.

In existing PC-based client/server application environments there are situations in which many, perhaps hundreds, of users having widely variant levels of database expertise execute sophisticated database queries frequently and regularly on a single, powerful relational database management system (RDBMS). One example of such a situation is one in which a database is used to track information regarding a company's employees. Such a database is relied upon and used many times a day by management staff, accounting staff, and personnel staff for various purposes. Since the people actually using the database are not necessarily fluent in database languages or procedures, it is necessary to have an effective, i.e., easy to use, and efficient interface between the user and the database itself.

Typically, the interface between the user and the database is programmed in advance by a database programmer using an application development package having various database "tools", which range in sophistication from a programming language, e.g., the C programming language, to so-called "application builders" which provide software routines to automate some tasks, e.g., window managers to control data presentation effects such as "pop-up" windows, menu bars, and "pull down" menus. Such an interface typically employs graphics, color, and animation, all of which are CPU-intensive functions executed by the front-end desktop computer.

With the ever-increasing movement of computing to the Internet, there is great interest in extending database development tools to leverage the connectivity provided by the Internet. More particularly, developer users are particularly interested in tools that allow application software, including database application programs, to be "hosted" by the user's own browser.

SUMMARY OF THE INVENTION

A Database Development System is described that provides methodologies for creating an HTML database control object for use in a Client/Server Database System The system includes one or more Clients (e.g., Terminals or PCs) connected via a Network to a Server. In general operation, Clients store data in and retrieve data from one or more database tables resident on the Server by submitting SQL commands, some of which specify "queries"—criteria for selecting particular records of a table. The system includes a "DataWindow"(previously patented and described in commonly-owned U.S. Pat. No. 5,566,330) that provides a unique type of component or object used to retrieve, display, and manipulate data from a relational database or other data source. DataWindow objects have knowledge about the data they are retrieving, and present information according to user-specified display formats, presentation styles, validation rules, expressions and other data properties, so dynamic data is used in the most meaningful way.

In accordance with the present invention, the DataWindow component is adapted for providing an HTML DataWindow component that is well integrated with "Web" (i.e., "World Wide Web") or hypertext technologies. The HTML DataWindow allows code-less creation and layout of forms, database queries, and result sets, automatic run-time generation of HTML and script for full range of DataWindow functionality, cross-browser HTML, with graceful degradation for older browsers, and client side validation (rules), date formatting, subtotals and computed columns.

A pure HTML DataWindow control is provided with the help of a Web page server (e.g., Sybase PowerDynamo™, available from Sybase, Inc. of Emeryville, Calif.) and a server component (which is invoked from that Web page server). Sybase PowerDynamo™ includes a Personal Web Server for use during development. The control is employed at design time to allow a developer to add database-driven content to his or her Web applications. In particular, using a Web or HTML DataWindow Design-Time Control (DTC) of the present intention, a developer visually drops the DataWindow onto an HTML editing surface (e.g., such as the previously-illustrated "Painters" that are displayed in PowerBuilder), and modifies the DTC properties as appropriate. Server code to create the DataWindow at runtime is then generated automatically. Client side validation (rules) defined for the DataWindow is translated into script commands (e.g., JavaScript, available from Netscape of Mountain View, Calif.) and executed on the client. JavaScript is a scripting language developed by Netscape to enable Web authors to design interactive sites. Although it shares many of the features and structures of the full Java language, it was developed independently. Javascript can interact with HTML source code, enabling Web authors to spice up their sites with dynamic content. No script commands need be written manually, however.

The HTML DataWindow serves as a thin-client DataWindow implementation for Web applications that provides most of the data manipulation, presentation, and scripting capabilities of the PowerBuilder DataWindow, without requiring any PowerBuilder DLLs (i.e., PowerBuilder runtime dynamic link libraries) on the client. DataWindow validation rules, formatting, and edit styles are converted into equivalent HTML and JavaScript. HTML is generated that is suitable for the target browser (using absolute positioning for Internet Explorer and relative positioning for Netscape). A plurality of functions and events are implemented by the generation of JavaScript which is downloaded to the client. In this manner, the Web or HTML DataWindow DTC supports generation of a runtime DataWindow object in HTML. It offers a thin-client solution that provides most of the data manipulation, presentation, and scripting capabilities of the PowerBuilder DataWindow without requiring any PowerBuilder DLLs or plugins on the Web client. The DataWindow that displays in the Web browser looks very much like the DataWindow one-way design in the PowerBuilder DataWindow painter.

The HTML DataWindow uses a component running in a transaction server (such as Sybase Jaguar™ transaction server or Microsoft Transaction Server (MTS)) cooperating with a dynamic page server (such as Sybase PowerDynamo™ or Microsoft Active Server Pages in IIS) and communicating with a Web client via a Web server. The server component can also be called directly from the dynamic page server without a transaction server, but using a transaction server usually provides better performance (because database connections and instances of the component can be cached).

The overall method of operation of an HTML DataWindow of the present invention is as follows. First, in a Web browser, a user requests the URL (Universal Resource Locator) for a page. The Web server passes the request to the page server, which locates the template for the requested page and executes server-side scripts in the template. The server-side scripts connect to the server component, passing it information about the DataWindow and the database connection. Methods on the server component retrieve data required for the DataWindow from the database and translate the DataWindow definition, data, and state into HTML and JavaScript. The server component returns the HTML and JavaScript to the page server. Then, the page server replaces the server-side script in the requested Web page with the generated HTML and JavaScript and returns the page to the Web browser via the Web server. The user interacts with the HTML DataWindow, for example requesting the next page or updating the data. The Web server passes the URL with added action parameters to the page server. The cycle begins again for the next user requests (if any).

Operation of the HTML DataWindow stems from cooperation of two main components: a server component and a client control. The server component retrieves data from a database and returns HTML and JavaScript that represent the data and the DataWindow object definition to the page server. In a preferred embodiment, the server component is a PowerBuilder custom class user object that uses a data store ("DataStore") to handle retrieval and updates and is deployed as a Jaguar (Sybase) or COM (Microsoft) distributed component. COM (Component Object Model) is a model for binary code developed by Microsoft that enables programmers to develop objects that can be accessed by any COM-compliant application; both OLE and ActiveX are based on COM. A DataStore is a nonvisual DataWindow control. DataStores act just like DataWindow controls except that they do not have many of the visual characteristics associated with DataWindow controls. Like a DataWindow control, a DataStore has a DataWindow object associated with it.

The server component includes methods that the developer calls in his or her Web page template to instantiate and configure the component. The HTML DataWindow client control, the other hand, represents the JavaScript and HTML that is generated by the server component and embedded in the page returned to the Web client. Client-side scripts that the developer adds to his or her Web page template and wrap in SCRIPT tags are embedded as JavaScript in the client control. Some features available on the client control are optional: events, methods, data update and validation, and display formatting for newly-entered data. The size of the generated JavaScript increases as one adds more client-side functionality. Events that are triggered on the client control and several of the client control methods do not require the server component to reload the page, so processing on the client is typically much faster than processing performed on the server.

The HTML DataWindow control is fully generated by the server component using standard HTML and JavaScript. The generated HTML control and the page server component cooperate to provide the DataWindow functionality. The server component is written in PowerScript (i.e., PowerBuilder scripting language) and deployed as an ActiveX and a server component (e.g., using Sybase Jaguar application server). The server component performs data access, optionally maintaining state and dynamically generating the HTML to render the control, with its data and state, for inclusion on a page. The generated HTML control assumes the existence of a page server and includes the current state of the DataWindow such that the server component can run in a fully stateless mode. It support navigations and optional data input, data modification, data validation, insert, delete and update. The version of the browser may be taken into account during HTML generation so that the functionality of the control will degrade as gracefully as possible.

Actual hosting of the control occurs as follows. First, the browser talks to a Web server via HTTP (HyperText Transfer Protocol). The Web server talks to a page server (e.g., Sybase Web.PB) via CGI, ISAPI or NSAPI. For an introduction to Internet communication protocols (e.g., HTTP), see e.g., William Stallings, *The Backbone of the Web*, BYTE, October 1996, the disclosure of which is hereby incorporated by reference. The page server, in response, loads a page template and runs the server side scripts. The server side scripts talks to the server component to generate the HTML control that represents the DataWindow and its current state. This generated HTML control is inserted into the template and returned to the client. When a navigation or action button is pressed on the HTML control, an HTML POST action is done to the same page, passing back the stored state, the action and any other page state. This request gets to the server side script running in the page template in the same manner as before. The server side script passes the action and context to the server component and then regenerates the HTML control. The newly generated HTML control is inserted into the template and returned to the client.

BRIEF DESCRIPTION OF THE DRAWINGS

FIG. 11A is a diagram illustrating use of script or procedural code, for responding to events which occur in the system.

FIGS. 11B–C are diagrams illustrating scripts which include comments, variable declarations, executable statements, and embedded SQL statements.

FIG. 11D is a diagram illustrating a script function employing embedded SQL.

DETAILED DESCRIPTION OF A PREFERRED EMBODIMENT

The following description will focus on the presently-preferred embodiment of the present invention, which is operative in a network environment executing client/server database applications. The present invention, however, is not limited to any particular application or environment. Instead, those skilled in the art will find that the present invention may be advantageously applied to any of those application or environment where browser-based rendering of information is desirable, including information from non-SQL database management systems and the like. The description of the exemplary embodiments which follows is, therefore, for the purpose of illustration and not limitation.

Standalone System Hardware

Figure 1A:
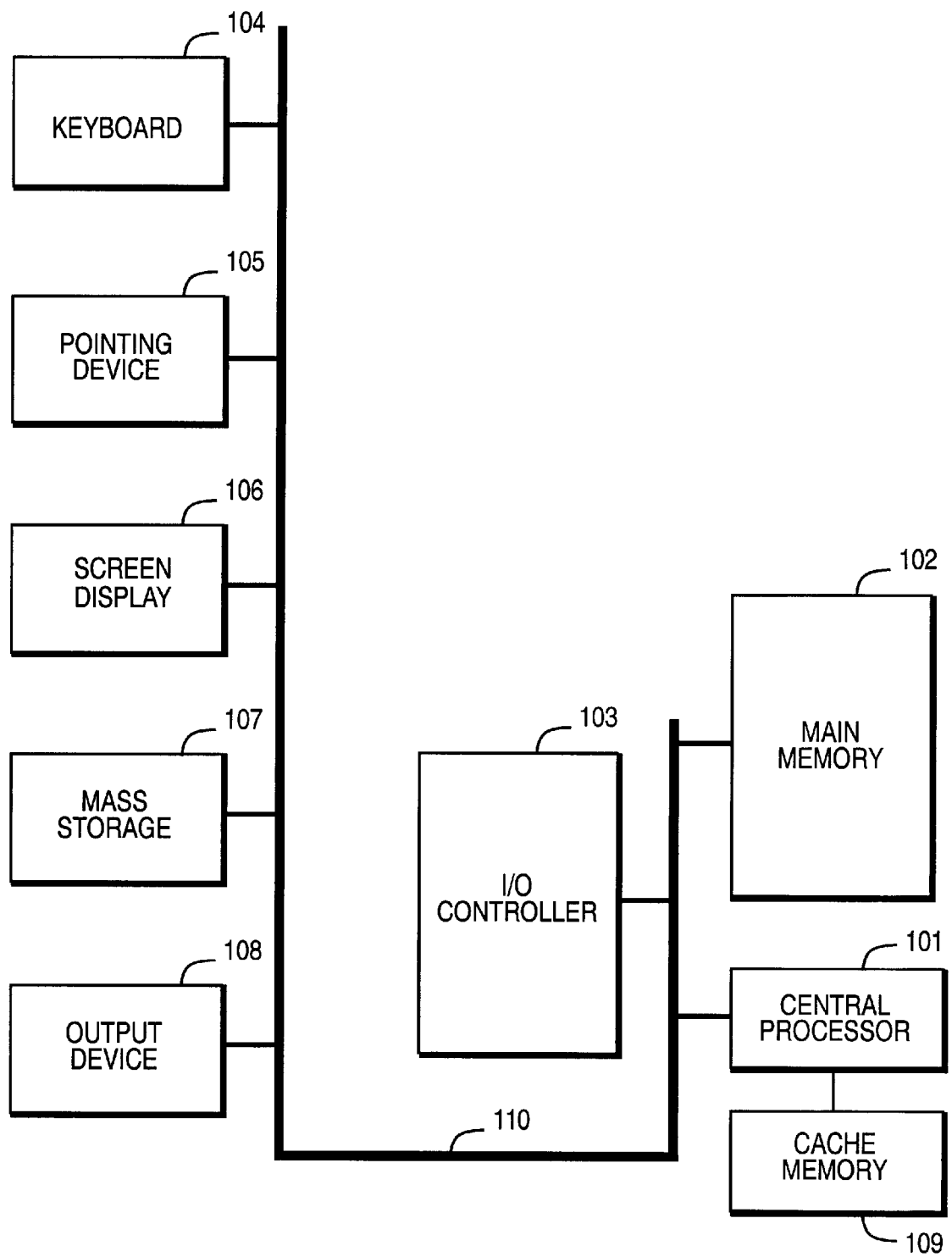
FIG. 1A is a block diagram of a computer system in which the present invention may be embodied.

The invention may be embodied on a computer system such as the system 100 of FIG. 1A, which comprises a central processor 101, a main memory 102, an input/output controller 103, a keyboard 104, a pointing device 105 (e.g., mouse, track ball, pen device, or the like), a screen display device 106, and a mass storage 107 (e.g., hard or fixed disk, removable disk, optical disk, magneto-optical disk, or flash memory). Processor 101 includes or is coupled to a cache memory 109 for storing frequently accessed information; memory 109 may be an on-chip cache or external cache (as shown). Additional output device(s) 108, such as a printing device, may be included in the system 100 as desired. As shown, the various components of the system 100 communicate through a system bus 110 or similar architecture. In a preferred embodiment, the system 100 includes an IBM-compatible personal computer system, available from a variety of vendors (including IBM of Armonk, N.Y.).

Standalone System Software

Figure 1B:
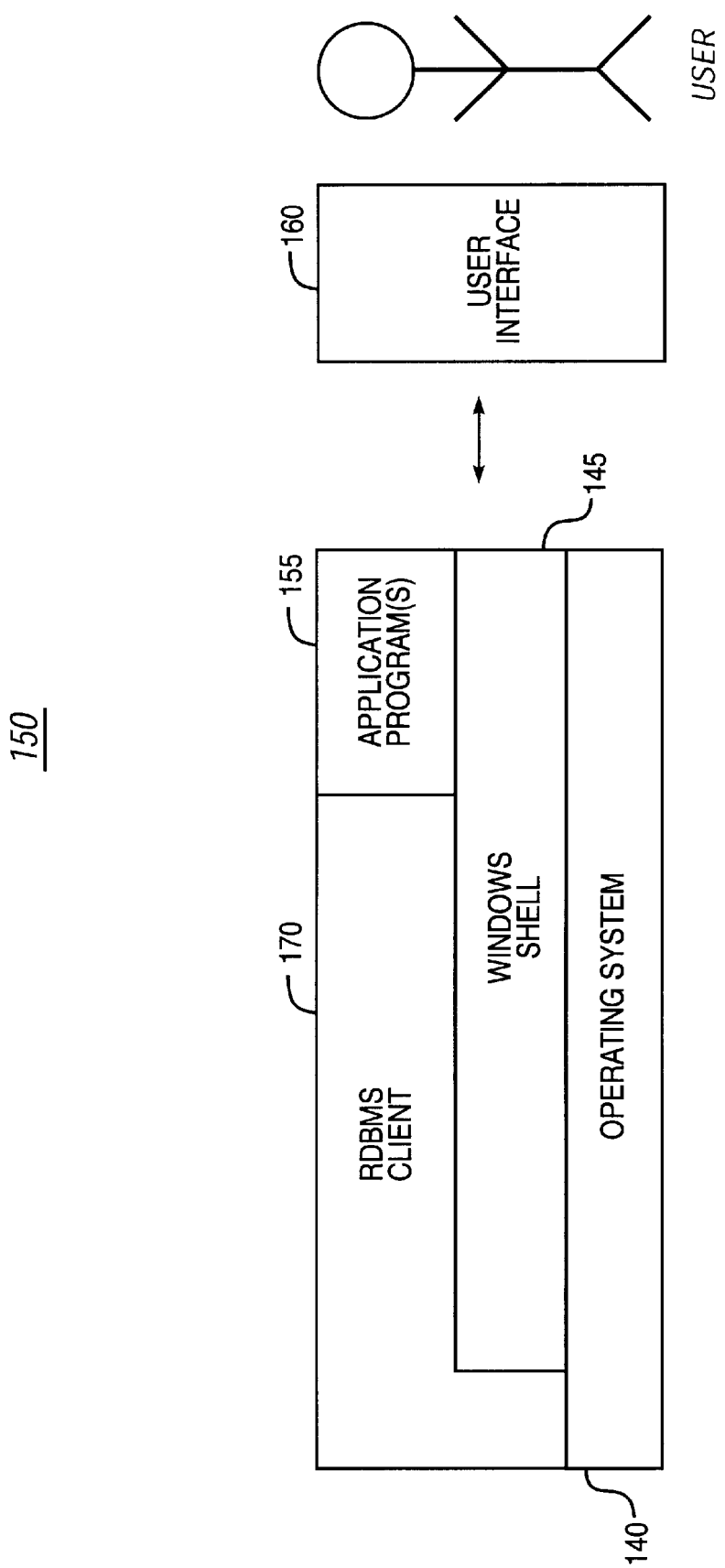
FIG. 1B is a block diagram of a software subsystem for controlling the operation of the computer system of FIG. 1A.

Illustrated in FIG. 1B, a computer software system 150 is provided for directing the operation of the computer system 100. Software system 150, which is stored in system memory 102 and on mass storage or disk memory 107, includes a kernel or operating system (OS) 140 and a windows shell 145. One or more application programs, such as application software programs 155, may be "loaded" (i.e., transferred from storage 107 into memory 102) for execution by the system 100. The system also includes a user interface 160 for receiving user commands and data as input and displaying result data as output.

Also shown, the software system 150 includes a Relational Database Management System (RDBMS) front-end or "client" 170, which includes database development environment and tools. The RDBMS client 170 comprises a database front-end development environments, such as Sybase PowerBuilder™ (the preferred embodiment). In an exemplary embodiment, the front-end will include SQL access drivers (e.g., Borland SQL Links, Microsoft ODBC drivers, Intersolv ODBC drivers, and the like) for accessing database tables from an SQL database server operating in a Client/Server environment. In the most-preferred embodiment, RDBMS client/development environment comprises PowerBuilder Enterprise for Windows, available from Sybase, Inc. of Emeryville, Calif. Description of PowerBuilder can be found in the manuals accompanying PowerBuilder Enterprise, including *Application Techniques, DataWindow Programmer's Guide, DataWindow Reference, PowerScript Reference, User's Guide*, and *Using the PowerBuilder Internet Tools*, which are available from Sybase, Inc. (and also currently available online at http://sybooks.sybase.com). Additional description can be found in application Ser. No. 08/393,049, filed Feb. 23, 1995, now U.S. Pat. No. 5,566,330. The disclosures of each of the foregoing are hereby incorporated by reference.

Client/Server Environment

A. General

Figure 2:
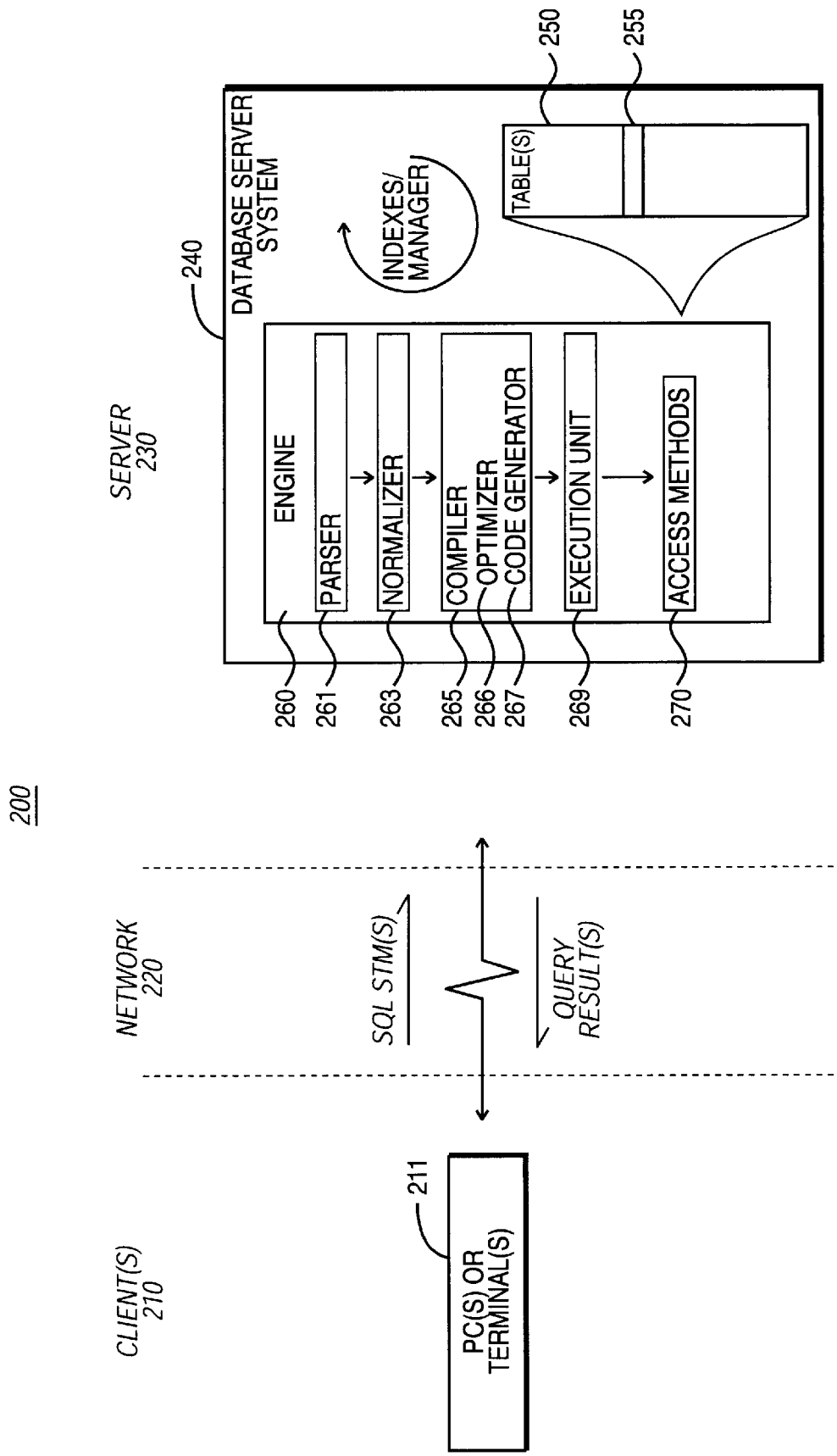
FIG. 2 is a block diagram of a client/server system in which the present invention is preferably embodied.

While the present invention may operate within a single (standalone) computer (e.g., system 100 of FIG. 1A), the present invention is preferably embodied in a multi-user computer system, such as a Client/Server environment. FIG. 2 illustrates the general structure of a Client/Server Database System 200 suitable for implementing the present invention (e.g., for deploying a database control object created in accordance with the teachings of the present invention). As shown, the system 200 comprises one or more Client(s) 210 connected to a Server 230 via a Network 220. Specifically, the Client(s) 210 comprise one or more standalone Terminals 211 connected to a Database Server System 240 using a conventional network. In an exemplary embodiment, the Terminals 211 may themselves comprise a plurality of standalone workstations, dumb terminals, or the like, or comprise personal computers (PCs) such as the above-described system 100. Typically, such units would operate under a client operating system, such as Microsoft Windows/MS-DOS for PC clients.

The Database Server System 240, which comprises Sybase Adaptive Server™ (formerly Sybase SQL Server™) available from Sybase, Inc. in an exemplary embodiment, generally operates as an independent process (i.e., independently of the Clients), running under a server operating system such as Microsoft Windows NT/2000 (Microsoft Corp. of Redmond, Wash.), NetWare (Novell of Provo, Utah), UNIX (Novell), or OS/2 (IBM). The Network 220 may be any one of a number of conventional network systems, including a Local Area Network (LAN) or Wide Area Network (WAN), as is known in the art (e.g., using Ethernet, IBM Token Ring, or the like). The Network includes functionality for packaging client calls in the well-known SQL (Structured Query Language) together with any parameter information into a format (of one or more packets) suitable for transmission across a cable or wire, for delivery to the Database Server System 240.

Client/server environments, database servers, and networks are well documented in the technical, trade, and patent literature. For a discussion of database servers and client/server environments generally, and SQL Server™ particularly, see, e.g., Nath, A., *The Guide to SQL Server*, Second Edition, Addison-Wesley Publishing Company, 1995. Additional documentation of SQL Server™ is available from Sybase, Inc. as *SQL Server Documentation Set* (Catalog No. 49600). For a general introduction to a Local Area Network operating under NetWare, see Freed, L. et al., *PC Magazine Guide to Using NetWare*, Ziff-Davis Press, 1991. A more detailed discussion is available in NetWare 3.x and 4.x and accompanying documentation, which is available from Novell of Provo, Utah. The disclosures of each of the foregoing are hereby incorporated by reference.

In operation, the Client(s) 210 store data in or retrieve data from one or more database tables 250, shown in FIG. 2. Typically resident on the Server 230, each table itself comprises one or more horizontal rows or "records" (tuples) together with vertical columns or "fields." A database record includes information which is most conveniently represented as a single unit. A record for an employee, for example, may include information about the employee's ID Number, Last Name and First Initial, Position, Date Hired, Social Security Number, and Salary. Thus, a typical record includes several categories of information about an individual person, place, or thing. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed.

In operation, the Client(s) issue one or more SQL commands to the Server. SQL commands may specify, for instance, a query for retrieving particular data (i.e., data records meeting the query condition) from the table 250. The syntax of SQL (Structured Query Language) is well documented; see, e.g., the above-mentioned *An Introduction to Database Systems*. In addition to retrieving the data from Database Server tables, the Client(s) also include the ability to insert new rows of data records into the table; Client(s) can also modify and/or delete existing records in the table.

For enhancing the speed in which the Database Server stores, retrieves, and presents particular data records, the Server maintains one or more database indexes on the table, under control of an Index Manager. A database index, typically maintained as a B-Tree data structure, allows the records of a table to be organized in many different ways, depending on a particular user's needs. An index may be constructed as a single disk file storing index key values together with unique record numbers. The former is a data quantity composed of one or more fields from a record; the values are used to arrange (logically) the database file records by some desired order (index expression). The latter are unique pointers or identifiers to the actual storage location of each record in the database file. Both are referred to internally by the system for locating and displaying records in a database file. Alternatively, instead of storing unique record numbers, a "clustered" index may be employed. This is an index which stores the data pages of the records themselves on the terminal or leaf-level nodes of the index.

In operation, the SQL statements received from the one or more Clients 210 (via Network 220) are processed by Engine 260 of the Database Server System 240. The Engine 260 itself comprises a Parser 261, Normalizer 263, Compiler 265, Execution Unit 269, and Access Methods 270. Specifically, the SQL statements are passed to the Parser 261 which converts the statements into a query tree—a binary tree data structure which represents the components of the query in a format selected for the convenience of the system. In this regard, the Parser 261 employs conventional parsing methodology (e.g., recursive descent parsing).

The query tree is normalized by the Normnalizer 263. Normalization includes, for example, the elimination of redundant data. Additionally, the Normalizer 263 performs error checking, such as confirming that table names and column names which appear in the query are valid (e.g., are available and belong together). Finally, the Normalizer can also look up any referential integrity constraints which exist and add those to the query.

After normalization, the query tree is passed to the Compiler 265, which includes an Optimizer 266 and a Code Generator 267. The Optimizer is responsible for optimizing the query tree. The Optimizer performs a cost-based analysis for formulating a query execution plan. The Optimizer will, for instance, select the join order of tables (e.g., when working with more than one table); it will select relevant indexes (e.g., when indexes are available). The Optimizer, therefore, performs an analysis of the query and picks the best execution plan, which in turn results in particular ones of the Access Methods 270 being invoked during query execution.

The Code Generator 267, on the other hand, converts the query tree into a set of instructions suitable for satisfying the query. These instructions are passed to the Execution Unit 269. Operating under the control of these instructions, the Execution Unit 269 generates calls into lower-level routines, such as the Access Methods 270, for retrieving relevant information (e.g., row 255) from the database table 250. The Access Methods operate in conjunction with multiple Buffer Managers to access the data (described in detail in commonly-owned application Ser. No. 08/554,126, filed Nov. 6, 1995, now U.S. Pat. No. 5,812,996, and hereby incorporated by reference), as required by the query plan. After the plan has been executed by the Execution Unit, the Server returns a query result or answer table back to the Client(s).

B. Designing an Application in an Integrated Development Environment

Before describing how to use a HTML or Web-based database control object of the present invention in detail, it is first helpful to review the task of designing an application in the integrated development environment (i.e., PowerBuilder™) provided in the system of the present invention.

1. Requirements

One of the keys to successful application development (in PowerBuilder or any other development environment) is designing what a user is going to build before he/she begins building it. The way to start this design phase is to determine the detailed requirements that a user's application must meet to satisfy the needs of the ultimate end users.

Determining requirements entails figuring out, in real-world terms, what the application is to do when someone uses it. A user's goal should be to specify: A conceptual walk-through of the application, from the point when users start it to the point when they exit from it, and one or more perspectives of the application's composition, such as by flow, by components, by dependencies, or by usage.

To figure out the requirements of a typical client/server application, it is helpful to break them down into several different categories:

(1) Data access—Which database tables the application needs to use for its data input and output. Which basic database operations (create, retrieve, update, delete) the application needs to perform on these tables.

(2) User interface—How the application is to present this data to users. How users are to interact with the application to view the data, manipulate it, and navigate through the application's various displays.

(3) Processing—What the application is to do with the data to prepare it for display to the user or update to the database tables. What the flow of control is to be as the application performs its various operations.

(4) Program interaction—What data sharing (if any) the application needs to do with other programs. What additional services (if any) the application must get through the execution of other programs.

(5) Output—What reports the application needs to print and how it is to format them. What other materials (such as files) the application is to generate as a byproduct of its processing.

2. Sample Application

Consider an Order Entry application for a hypothetical company, Anchor Bay Nut Company. Referring back to the different categories of requirements above, representative requirements necessary for such an application include the following.

Figure 3A:
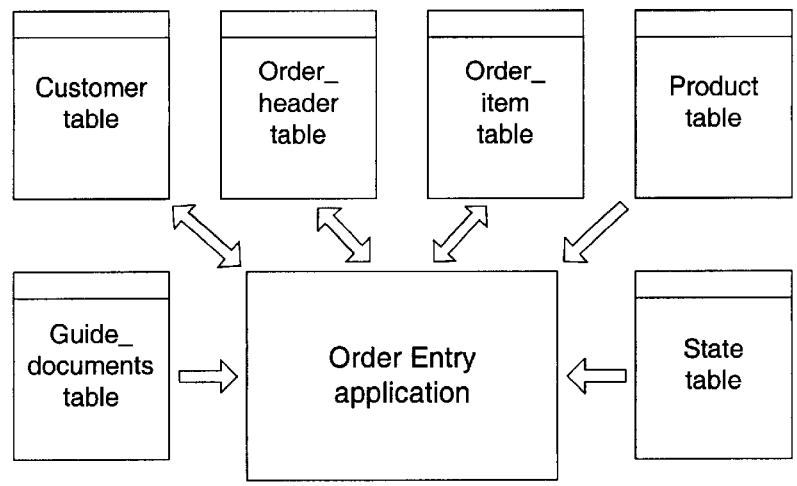
FIG. 3A is a block diagram illustrating data access in the system using a sample "order entry" application.
Figure 3B:
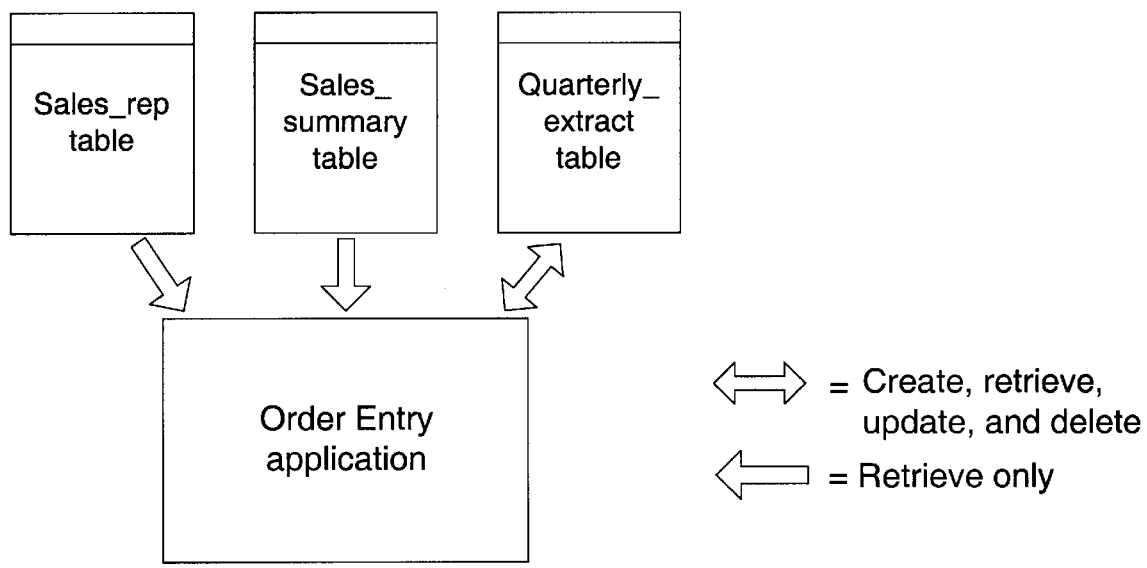
FIG. 3B is a block diagram illustrating data access to different database tables (e.g., residing on a server) for the order entry application.

(1) Data access—As illustrated in FIG. 3A, the Order Entry application needs to access the company's main database (e.g., ANCHRBAY.DB) from the server so that it can use these tables. As illustrated in FIG. 3B, the application also needs to access the company's sales database (e.g., ABNCSALE.DB) from the server so that it can use these tables.

(2) User interface—The Order Entry application needs to present major displays with which the user is to interact: One for viewing (retrieving) and maintaining (creating, updating, deleting) customer data in the Customer database table, and one for viewing and maintaining order data in the Order_header and Order_detail database tables. In the course of supporting these customer and order maintenance activities, the application must also present a number of more minor displays (such as for logging on to the databases, soliciting choices from the user, displaying messages, and more).

Figure 4A:
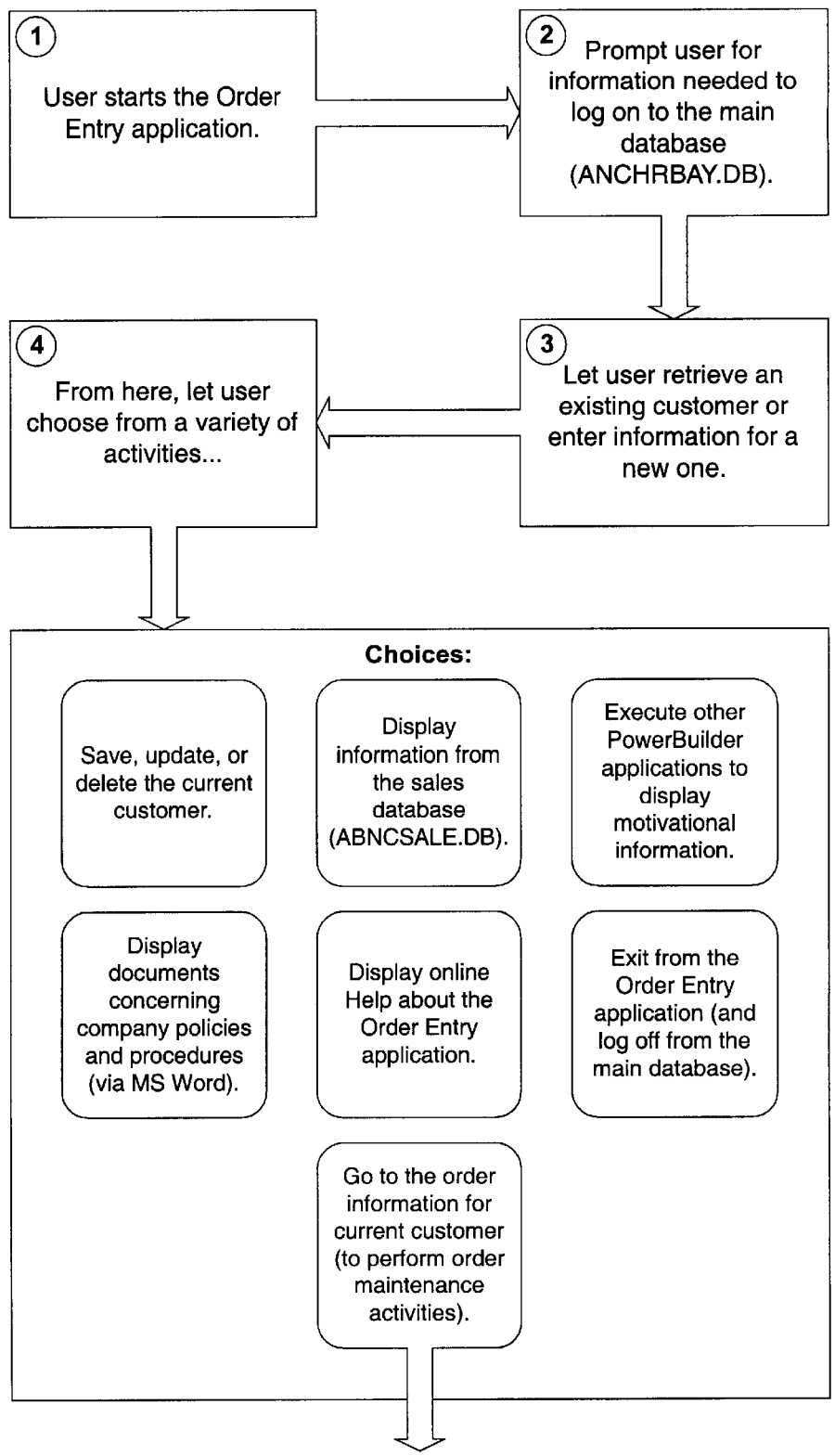
FIGS. 4A–B represent a flow diagram illustrating processing which occurs in the order entry application.
Figure 4B:
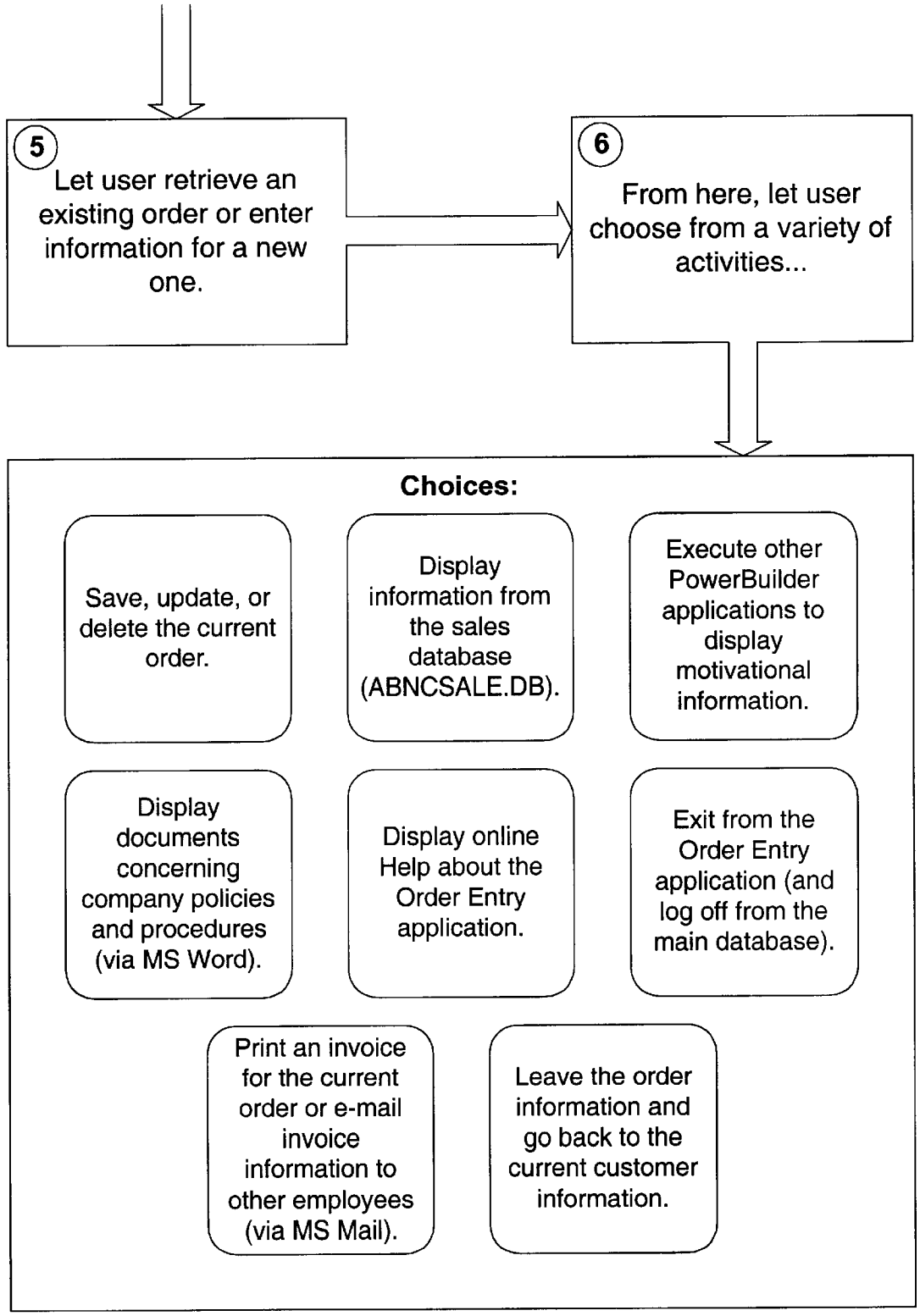

(3) Processing—FIGS. 4A–B represent the basic flow of processing that the user encounters when navigating through the sample Order Entry application (ignoring many of its supporting activities for the sake of simplicity).

(4) Program interaction—In support of its customer and order maintenance activities, the Order Entry application also needs to access some external programs, including: a text editor program (e.g., Microsoft Word) to let the user view documents concerning company policies and procedures; an electronic mail program (e.g., Microsoft Mail) to let the user send order invoices to other employees; and other existing applications (e.g., that were created with PowerBuilder) to display motivational information to the user.

Figure 4C:
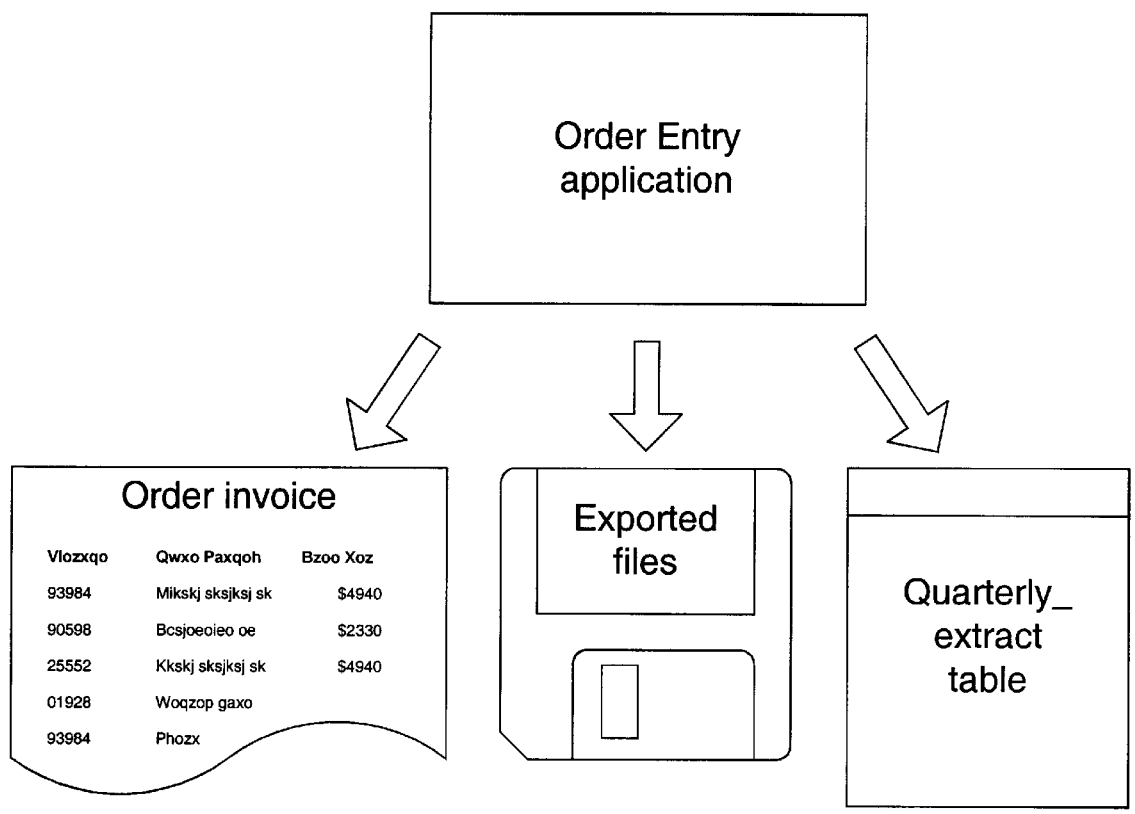
FIG. 4C is a block diagram illustrating various kinds of output which can be generated from the order entry application.

(5) Output—The Order Entry application should also produce various kinds of output when requested by the user. As illustrated in FIG. 4C, exemplary outputs includes printing an invoice for a particular order; exporting customer or order data to a file (using any one of several different file formats); and extracting quarterly data from the Sales_rep and Sales_summary tables of the sales database and storing that data in a new table (e.g., named Quarterly_extract).

Once a user developer (i.e., user other than the end user) knows the detailed requirements that his/her application must meet, a user then maps them to features that the development environment provides. This portion of the design phase includes specifying the accessing of data (e.g., by servers and other data sources); implementing the user interface (e.g., windows and controls); controlling the application's processing (e.g., events and scripts); extending the application's processing (e.g., external programs); and routing application output (e.g., reports, files, and "pipelines").

3. Accessing Data: Servers and Other Data Sources

Figure 5A:
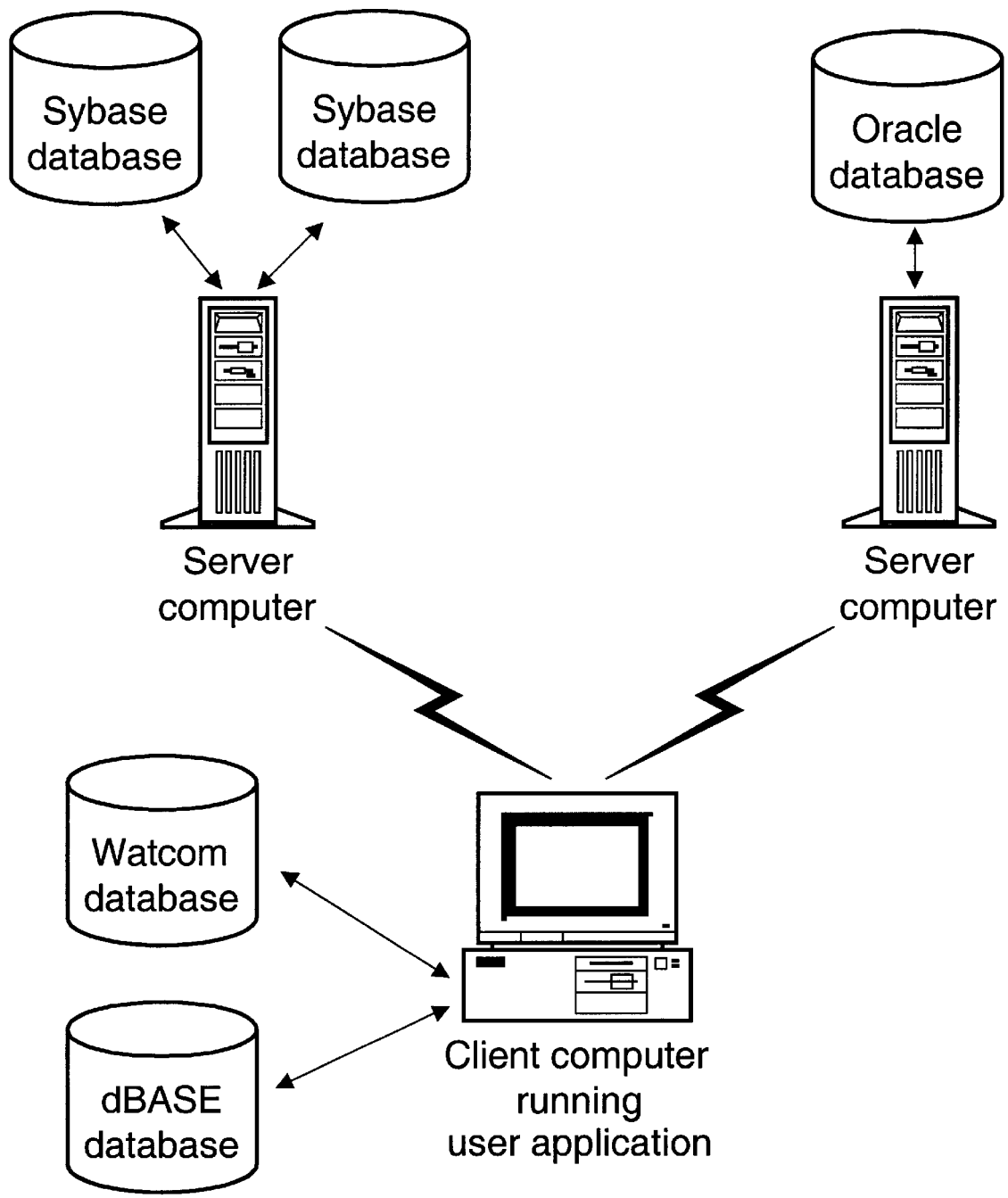
FIG. 5A is a block diagram illustrating that information in a client/server environment can be stored in different places (i.e., different servers) and in different formats (e.g., from a variety of different vendors).

The requirements of an application typically require access to at least one table and, typically, access to several tables. Often in a client/server environment, such tables are in different places and different formats. As illustrated in FIG. 5A, tables may be stored in one or more databases; those databases may be located in a variety of locations—on the client computer, on one or more server computers, or on a mix, with each of those databases implemented under a variety of DBMSs (database management systems).

The development environment provides an approach to data access that enables a user to successfully handle this potential database diversity in the applications a user builds. It does this by separating the DBMS-specific aspects of data access from an application to make it as independent as possible. This means a user can focus on the logical use of a table in his/her application instead of how that table is implemented in one particular database or another.

Figure 5B:
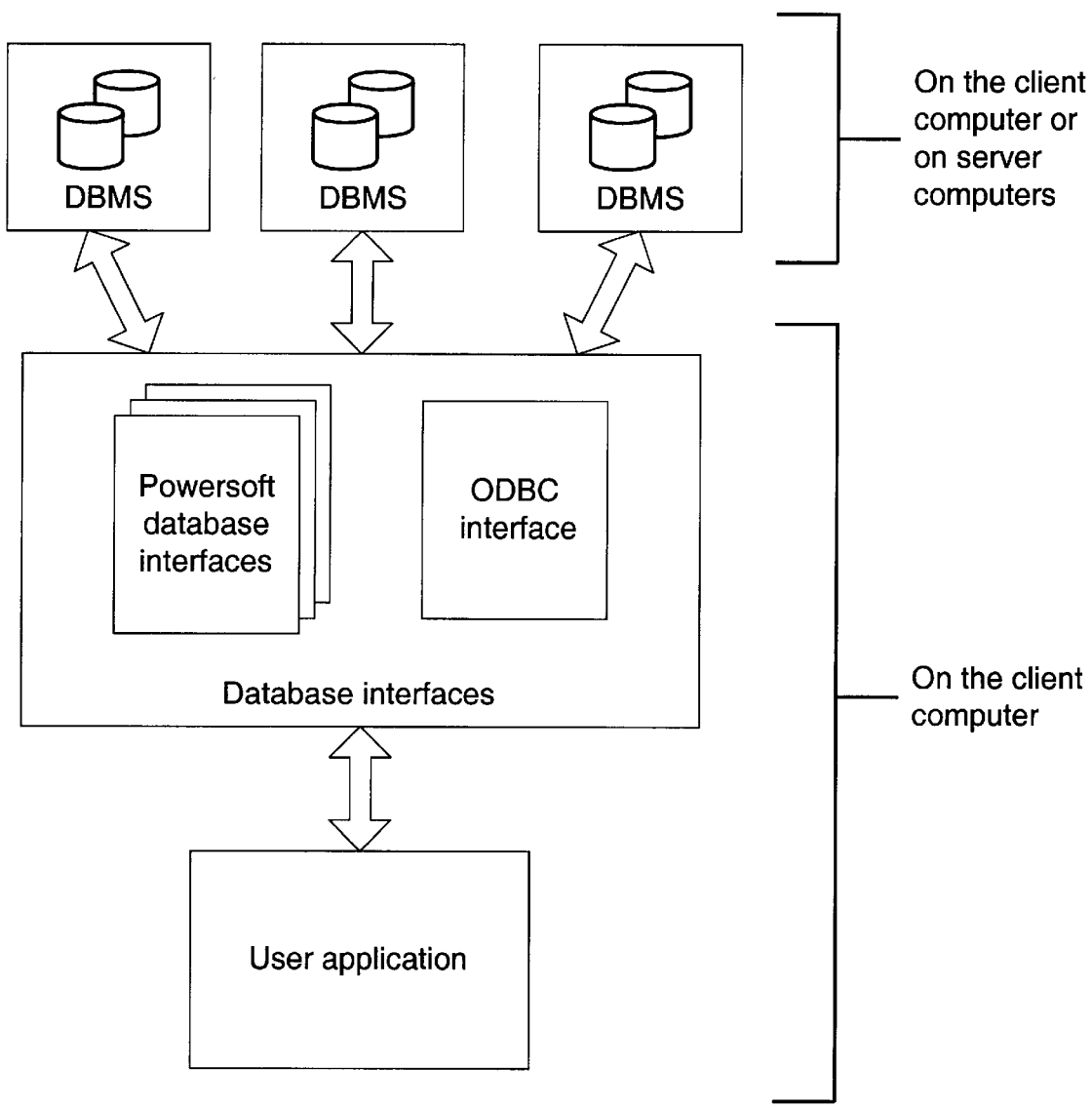
FIG. 5B is a block diagram illustrating a separate software layer—database interfaces—employed in the system for handling DBMS specific operations.

As illustrated in FIG. 5B, the development environment handles DBMS specifics in a separate software layer—database interfaces—that a user installs on the client computer along with his/her application. This layer consists of various database interfaces, each of which knows how to talk to a particular kind of DBMS and how to take advantage of the unique features of that DBMS. When a user's application requests any kind of access to a database, it relies on the appropriate database interface (depending on the DBMS for that database) to carry out the operation.

In an exemplary embodiment, two different kinds of database interfaces are provided for a user's application to use: Microsoft ODBC interface and Powersoft database interfaces. ODBC is the Open Database Connectivity API (application programming interface) developed by Microsoft to give applications standardized access to diverse data sources (which are usually databases, but can also be other kinds of files such as spreadsheets or text files). A user will design his/her application to use this interface if he/she wants to access one or more ODBC-compliant databases. For a database that is not ODBC-compliant, the development environment offers a variety of native interfaces, each of which knows how to talk to a specific DBMS (such as SQL Server or Oracle). If a user wants to access a SQL Server database, for example, a user will design his/her application to use the Powersoft SQL Server interface.

A user can design his/her application to use any combination of these database interfaces. The major benefit of this layered approach to data access is that it helps insulate a user's application from the complicated and potentially dynamic logistics of the typical client/server environment. As a result, the data access a user designs into his/her application is independent of a database's location or DBMS. Adapting a user's application to such changes can often be just a matter of pointing it to the database's new location and database interface. Additionally with the approach, a user can work with all of the tables in his/her application in the same way-using the same table-processing features—regardless of the DBMSs that are involved. Even in cases where a user wants to take advantage of capabilities unique to certain DBMSs (such as stored procedures, outer joins, referential integrity checking), a user will still use consistent techniques to do so.

Figure 6A:
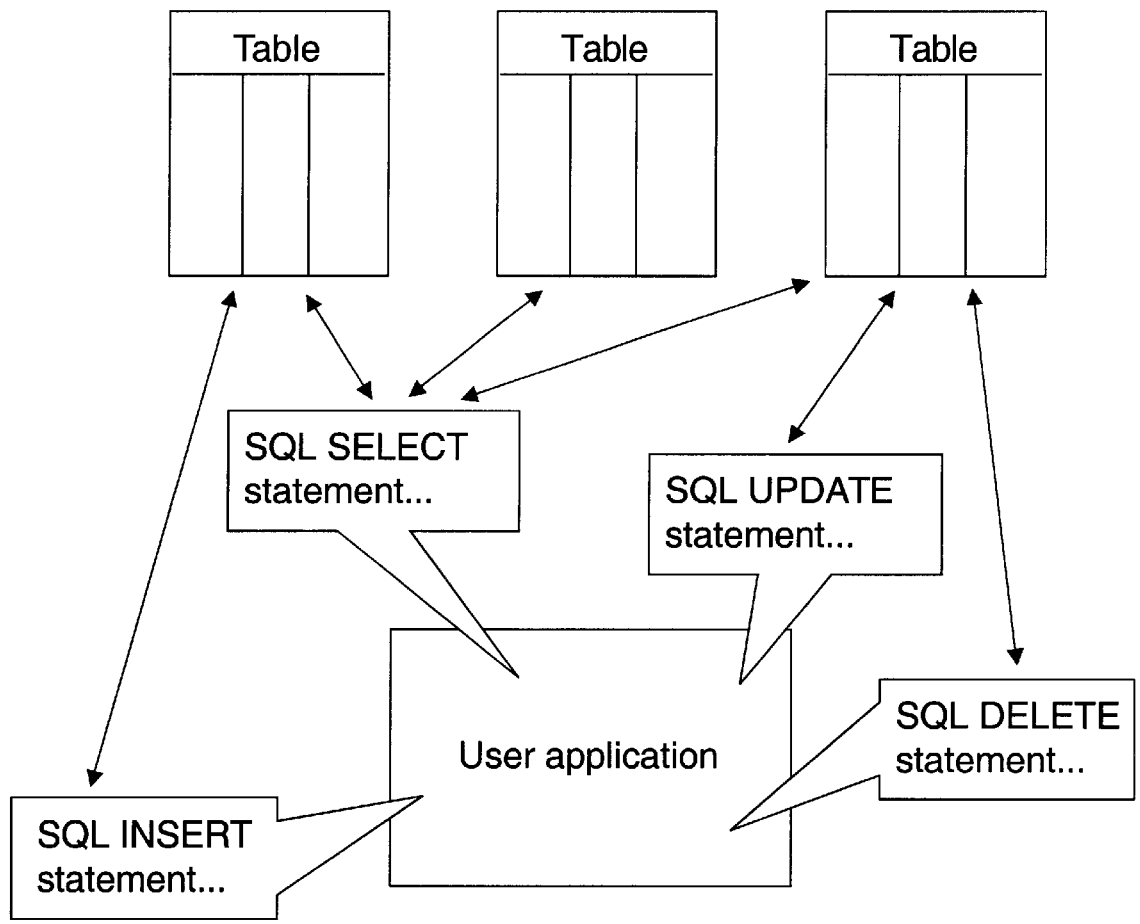
FIG. 6A is a block diagram illustrating use of embedded SQL within a user's application.
Figure 6B:
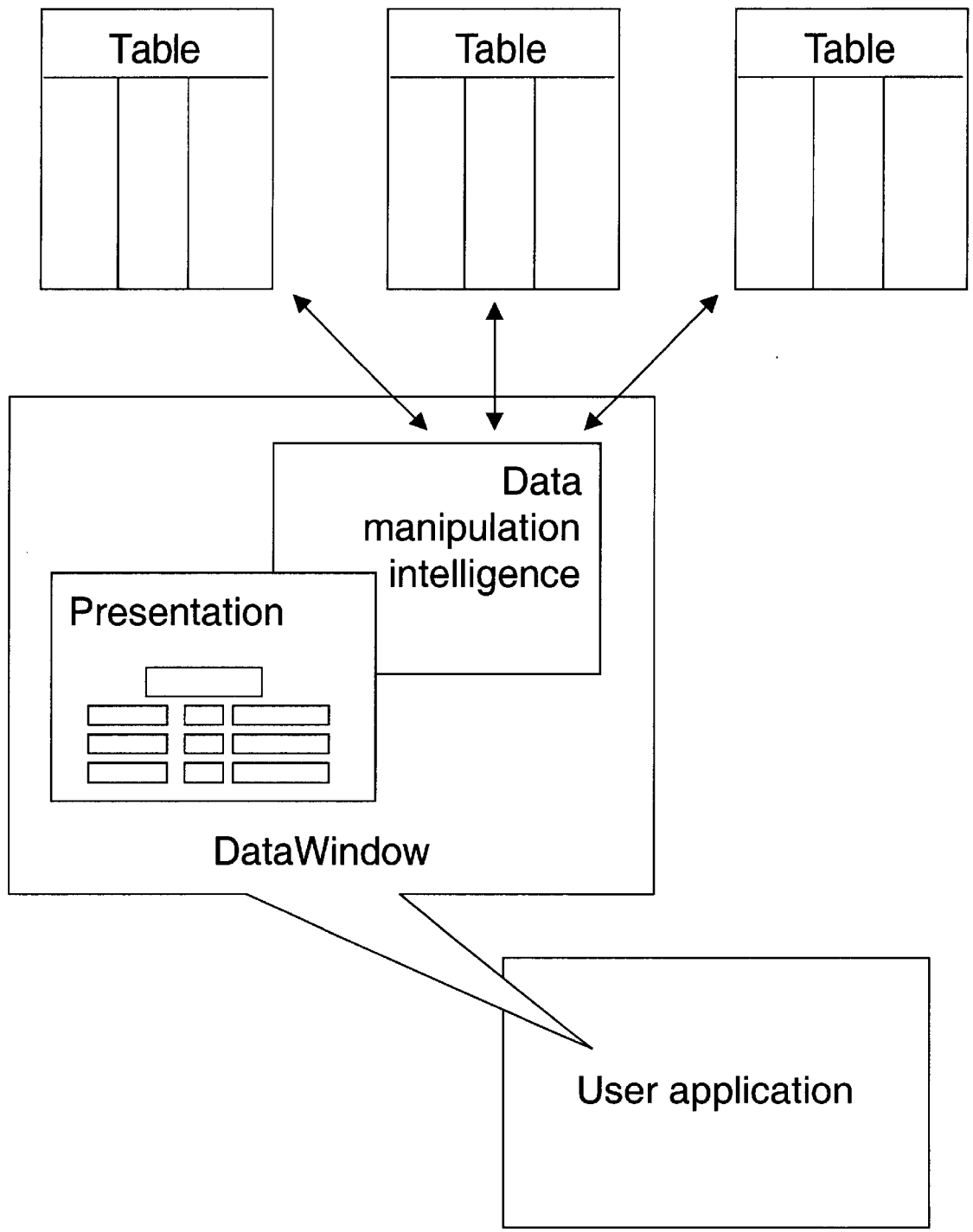
FIG. 6B is a block diagram illustrating use of a Power-Builder Data Windows component in one's application for manipulating and displaying database information.

In a user's application, typically numerous places exist where the application needs to create, retrieve, update, or delete rows in tables. Two basic techniques are provided: embedded SQL and PowerBuilder DataWindows. With the former, the user can embed SQL statements in his/her application to manipulate the rows. The development environment supports all of the usual features of this industry-standard language, along with DBMS-specific syntax: and extensions of its own. As illustrated in FIG. 6A, a user employs embedded SQL in places where a user's design calls for row manipulation without the need for display. As illustrated in FIG. 6B, the user uses DataWindows in his/her application to manipulate the rows and display them to the end user. DataWindows are a special access feature of PowerBuilder that a user employs for most of the table processing his/her application design requires. DataWindows contain both the intelligence to do row manipulation (including creation, retrieval, updating, deletion) and the presentation (user-interface) abilities to let people see and work with those rows.

The requirements for the Order Entry application specify that it must process several different tables from the two databases in a variety of different ways. In most cases, the processing involves letting the end user display and/or interact with the table data (using DataWindows). In the remaining situations (where no display of the data is involved), the developers can embed SQL statements in the application to do the job.

4. Implementing The User Interface: Windows and Controls

Figure 7A:
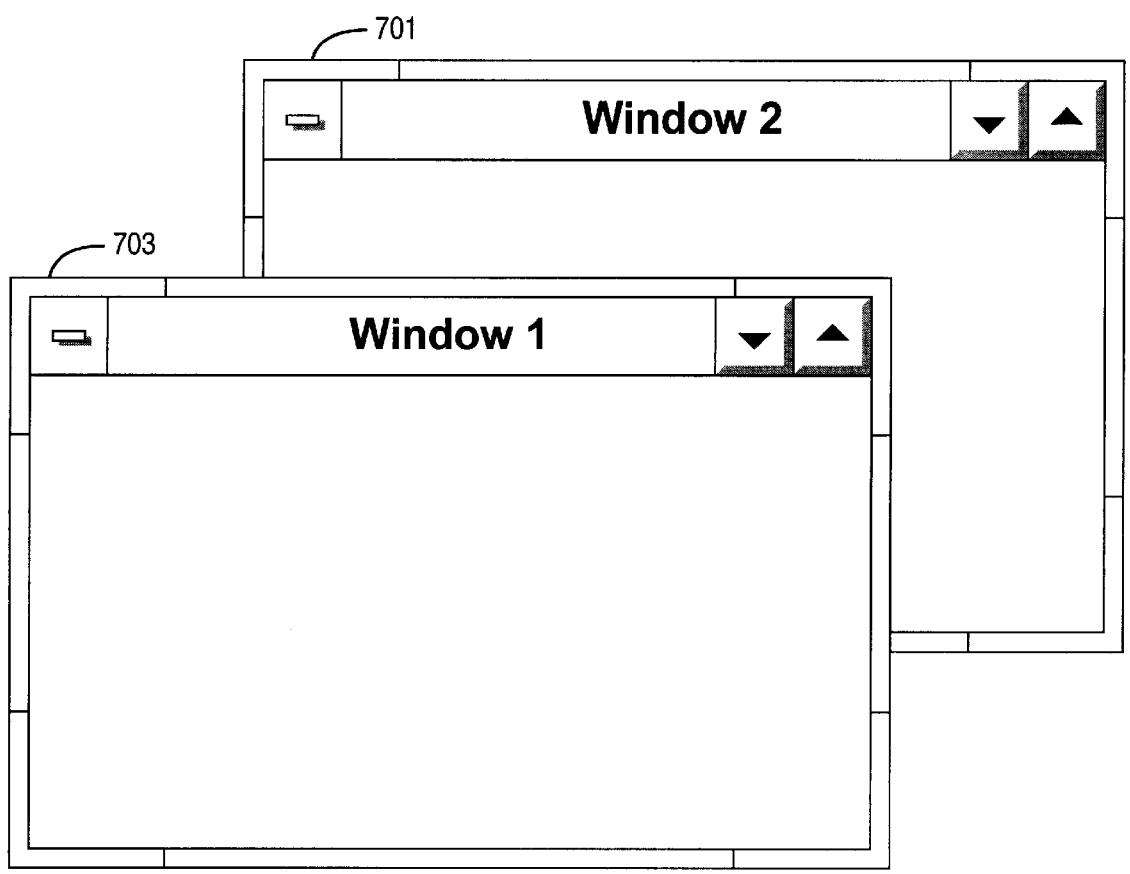
FIG. 7A is a diagram illustrating windows in a graphical user interface, which are employed as major building blocks to construct a user interface for an application developed in the system.

The user-interface requirements of a user's application enable people to interact in a number of ways with data that the application accesses. The user uses windows, such as windows 701 and 703 in FIG. 7A, as major building blocks to construct the user interface of an application in the development environment. Windows—rectangular frames that a user can usually move and resize on the screen—look and work just like the windows a user is already familiar with in his/her graphical operating. Windows provide features a user can use to let people view information, manipulate information, and initiate actions.

Figure 7B:
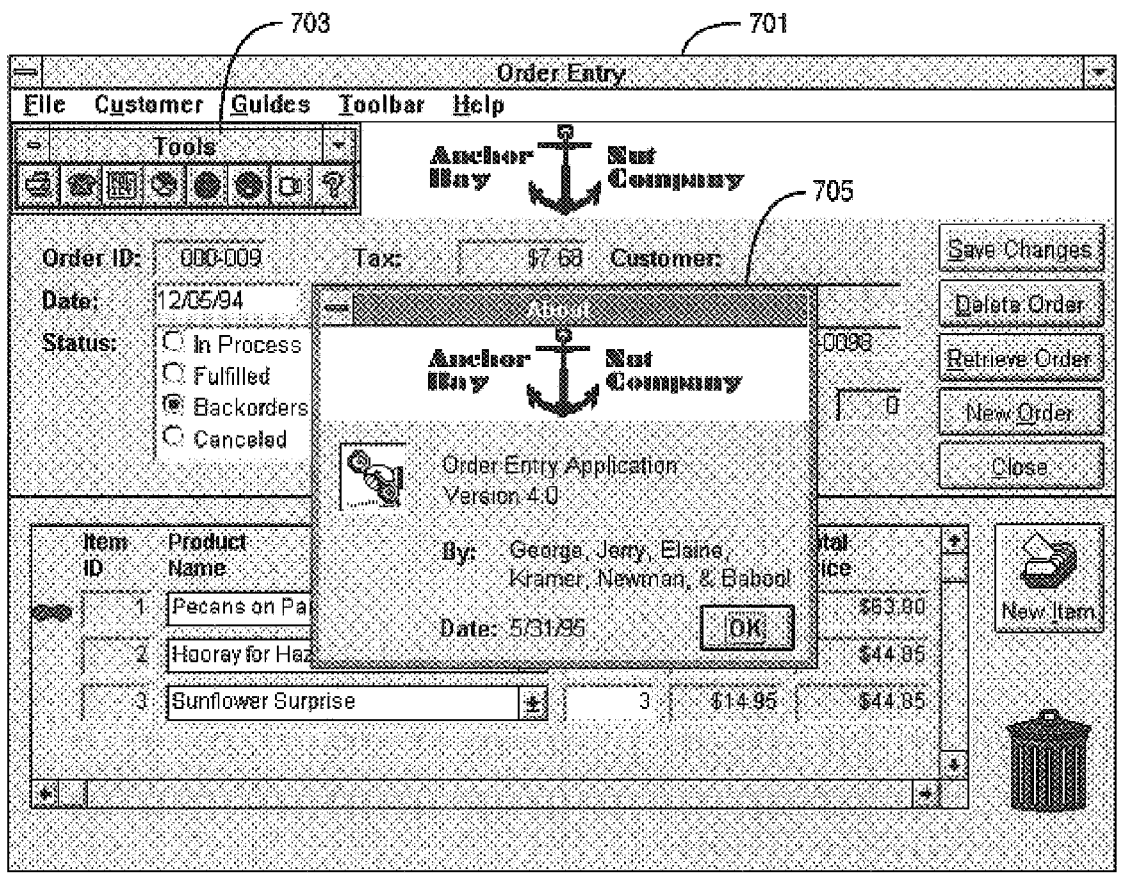
FIG. 7B is a bitmap screen shot illustrating different types of windows provided by the system for use in one's application.
Figure 7C:
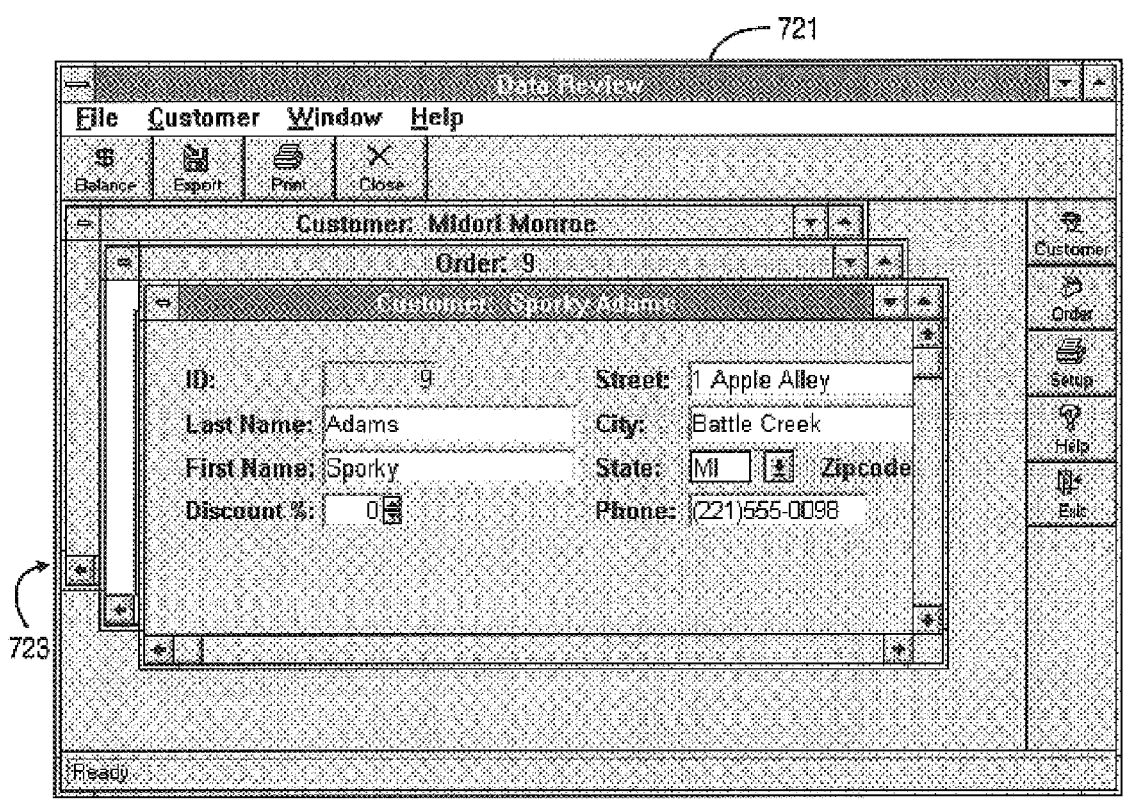
FIG. 7C is a block diagram illustrating use of an MDI (multi-document interface) style window, which can be employed in one's application.

A user can design the user interface of an application to involve just one window. More often, however, a user will involve several different windows, with each one playing a particular role to help the user get a larger job done. The role of any individual window is usually to present a particular kind of information and let users interact with that information in certain ways. As illustrated in FIG. 7B, several different types of windows are provided that a user can use in his/her application. Each type has some unique characteristics that make it good for fulfilling one or more specific presentation or interaction needs. Main windows (e.g., window 701) are where a user will usually have users perform the major activities of the application. Response windows and message boxes (e.g., window 705) are good for situations where one wants to force end users to consider some information and/or choose some action before they can do anything else in the application. Popup windows and child windows (e.g., window 703) are handy for displaying additional pieces of information, or providing additional services, that support the users activities as they work in a particular main window. As illustrated in FIG. 7C, MDI (multi-document interface) frames (e.g., frame 721) are useful in many applications where end users need a convenient and organized way to work with multiple main windows. When placed inside one of these frames, main windows act as sheets (e.g., sheets 723) that users can easily shuffle around.

Figure 8A:
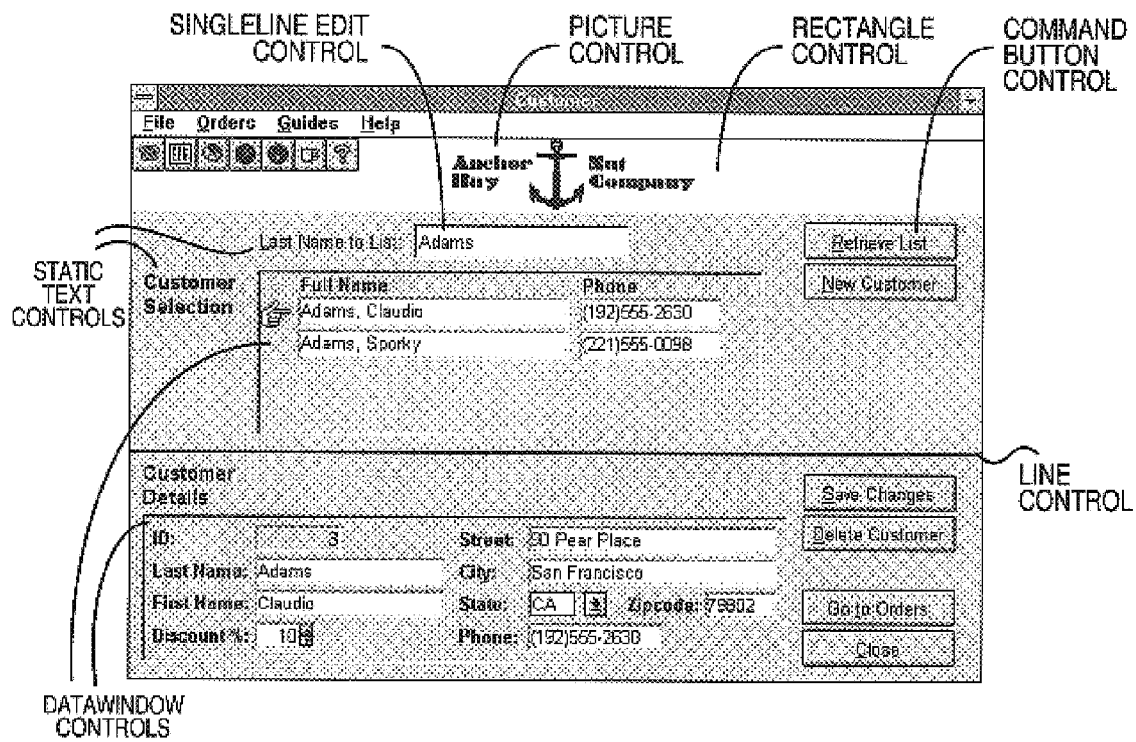
FIG. 8A is a bitmap screen shot illustrating different types of windows or "controls" which can be employed for creating a user interface of one's application.
Figure 8B:
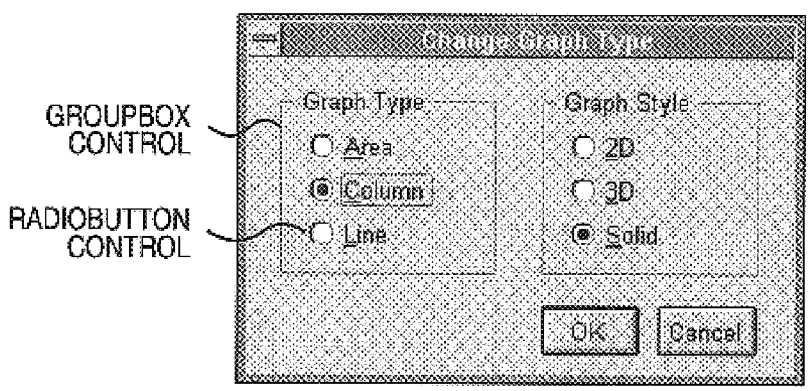
FIG. 8B is a bitmap screen shot illustrating group box and radio button controls.

As shown in FIGS. 8A–B, the development environment provides a wide range of controls a user can place in a window to hold the information end users need to see and to implement the interactions end users need to perform. Controls are provided for: (1) displaying and/or manipulating values (e.g., StaticText, SingleLineEdit, MultiLineEdit, and EditMask controls); (2) making choices (e.g., ListBox, DropDownListBox, CheckBox, and RadioButton controls); (3) showing information graphically (e.g., Graph, HScrollBar, VScrollBar controls); (4) dressing up a window (e.g., GroupBox, Line, Oval, Rectangle, RoundRectangle, and Picture controls); (5) presenting a user's DataWindows (i.e., a special kind of control that a user uses when he/she wants a window to display one of the DataWindows a user has designed for his/her application); and (6) initiating actions (e.g., CommandButton and PictureButton controls).

In addition to the preceding kinds of controls, a user can also use user-defined controls. A user can define his/her own controls based on one or more of the standard PowerBuilder controls and store them as application components called user objects. Then a user can include these custom-made controls in any windows a user wants. Additionally, a user can use third-party controls, such as VBX (Visual Basic extension) controls or controls in DLLs (dynamic link libraries), by defining them as user objects. These external controls can be included in any windows desired.

Figure 9A:
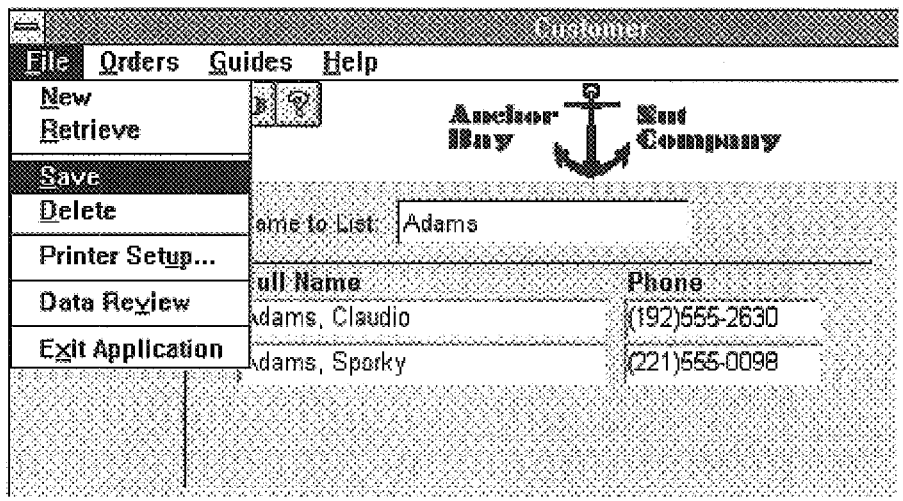
FIGS. 9A–C are bitmap screen shots illustrating user interface components for receiving user input, including a pull down menu, a tool bar, and a popup menu list.
Figure 9B:
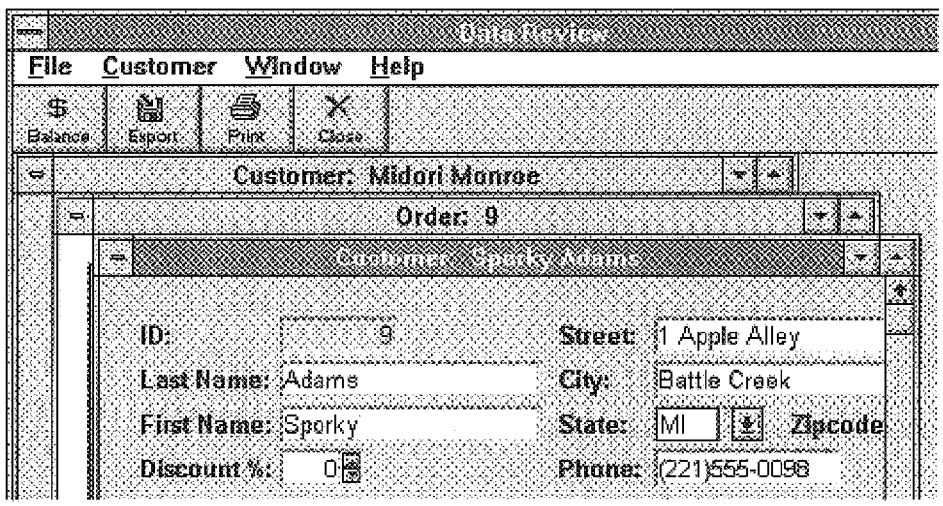
Figure 9C:
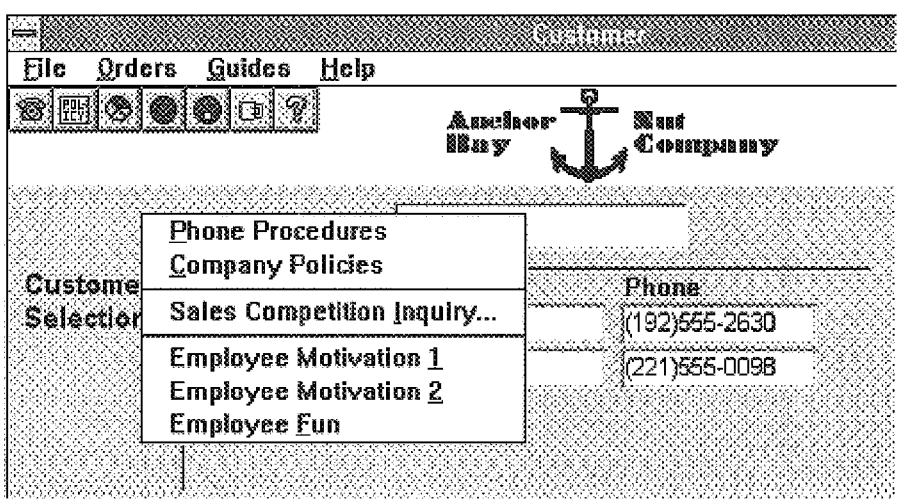

Another way to let the user initiate actions in a window is to use menus. A menu lists commands (menu items) that are currently available so that the user can select one. The development environment provides different methods for presenting menus in a window. In many of the windows a user designs, a user will want to display a menu of one or more items across the top in the menu bar, such as illustrated in FIG. 9A. This enables end users to move through those items and pull down submenus (dropdown menus) that a user has defined for each one. If the window is an MDI frame, a user can optionally define a toolbar, shown in FIG. 9B, to accompany the menu. The toolbar displays buttons corresponding to one or more menu items, giving the user an alternative way to select those items. Sometimes a user may want to let users initiate certain actions by popping up a menu within the window. A popup menu lists its items vertically, shown in FIG. 9C, enabling users to move up or down to select the item they want. Popup menus are handy for giving users quick access to a subset of the most common actions they perform in the window or to adjust those actions that apply to the current control.

5. Controlling The Application's Processing: Events and Scripts

After the user has sketched out the windows he/she needs, the user then specifies the flow of processing in his/her application, both within a window and from one window to another; and supply the specific processing logic that is to be performed for each activity of the application during the course of this flow. Applications created in the development environment are event-driven: an application waits to see what actions a user takes in a window to determine what processing to perform.

Figure 10A:
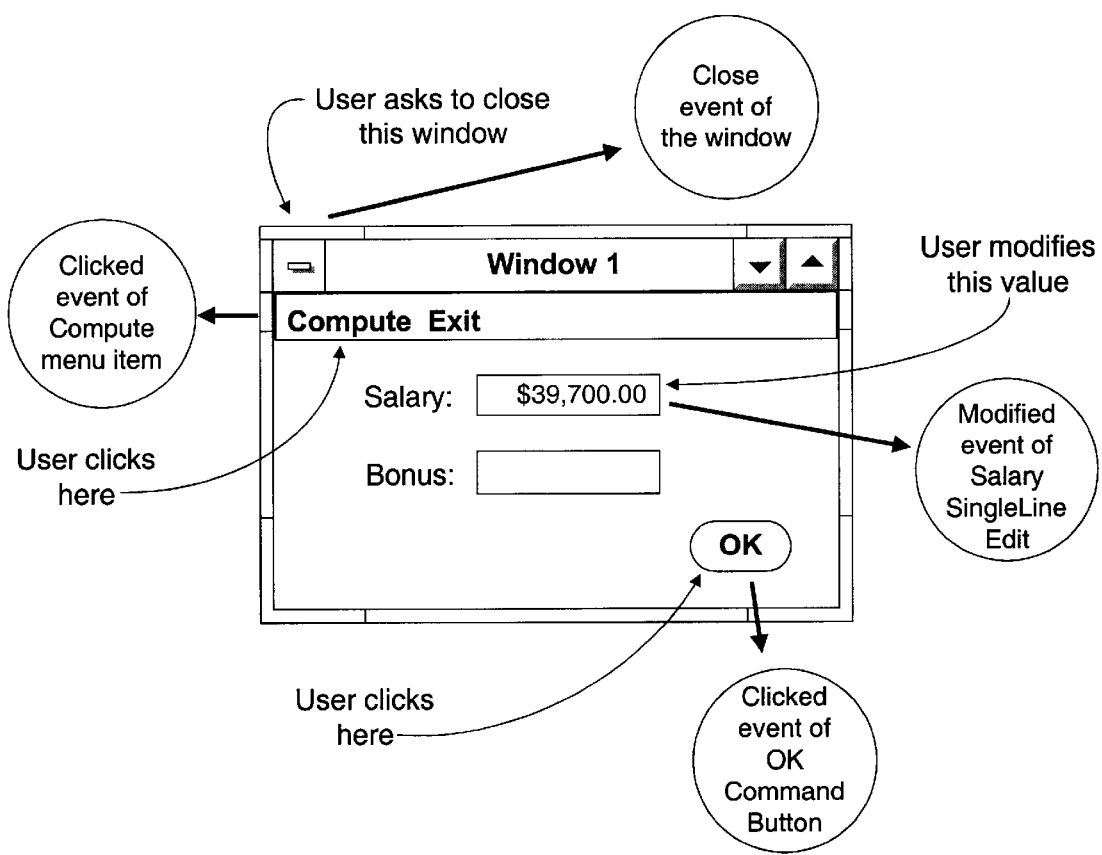
FIG. 10A is a block diagram illustrating different events which are triggered as a result of actions occurring at a user interface.

Whenever the user does something involving one of the application's user-interface components (such as a window, control, or menu item), that action triggers a particular event. As shown in FIG. 10A, for example, each of the following actions triggers a different event.

| Doing this | Triggers |
|---|---|
| Clicking on a particular Command Button control in a window | The Clicked event of that CommandButton control |
| Clicking on a particular menu item in a window's menu | The Clicked event of that menu item |
| Modifying the value in a particular SingleLineEdit control of a window | The Modified event of that SingleLineEdit control |
| Closing a particular window | The Close event of that window |

Figure 10B:
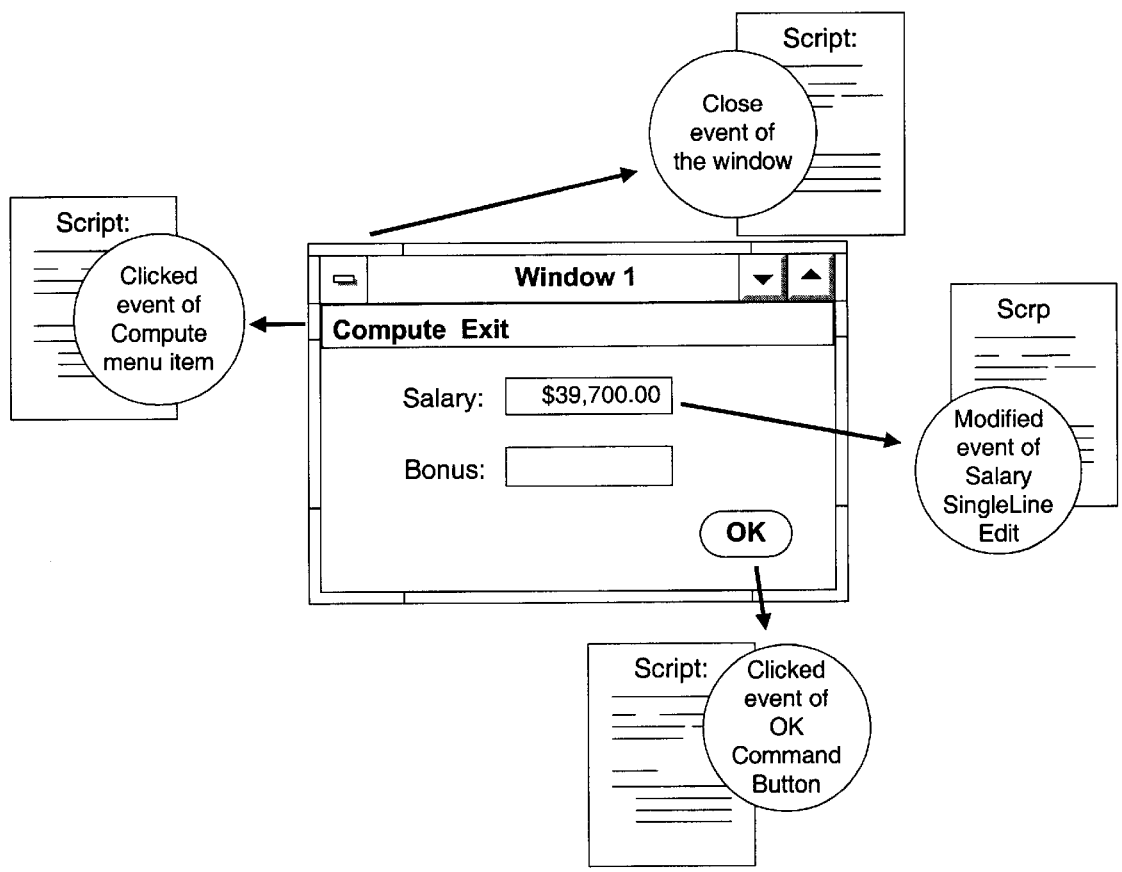
FIG. 10B is a block diagram illustrating execution of user-supplied script (instructions), which is triggered in response to occurrence of an event.

When an event is triggered, a user's application executes a corresponding script (e.g., PowerBuilder PowerScrip™), which contains any processing logic a user has written for that event. This is illustrated in FIG. 10B. A user's job as a designer, therefore, is to figure out all of the events of interest that might occur in his/her application and to provide appropriate processing logic for each event (in its script).

Each kind of user-interface component has its own set of several different events that can happen to it, including, for instance, the following.

| This component | Has |
|---|---|
| A CommandButton control | About a dozen different events, including: Clicked, GetFocus, and LoseFocus |
| A menu item | Just a couple of events: Clicked and Selected |
| A SingleLineEdit control | About a dozen different events, including: Modified, GetFocus, and LoseFocus |
| A window | More than 25 different events, including: Open, Close, Resize, Timer, and Clicked |

Some events apply to a user's application as a whole, including (1) one that is triggered when the application starts (the Open event), and (2) one that's triggered when the application ends (the Close event). In many cases, a user need only write scripts for just one or two of the events of a particular component (and sometimes a user won't need any for that component).

Letting end users drive the flow of processing is appropriate most of the time, but on occasion a user will want the application to temporarily take control. In such situations, the user can write code in the script of one event that manually causes another event to occur. When doing this, a user can either trigger the event so that its script executes right away, or post the event to a queue so that its script execution is deferred (until after the scripts of any earlier events have executed). A user can also define his/her own events for any particular component and then manually trigger or post them to execute their scripts. These "user events" are useful for extending the processing of other event scripts by serving as subroutines; and responding to certain lower-level messages (from a user's operating environment) that the development environment does not provide as standard events.

Once a user knows which events he/she needs to handle in his/her application, a user provides an appropriate script for each one. As illustrated in FIG. 11A, a script is a body of procedural code that a user writes in the PowerScript™ language to express the processing logic to perform, typically in response to particular events. Most scripts are relatively short (tens of lines long, not hundreds), since they just need to express the processing for particular events and not for the whole application.

Figure 11B:
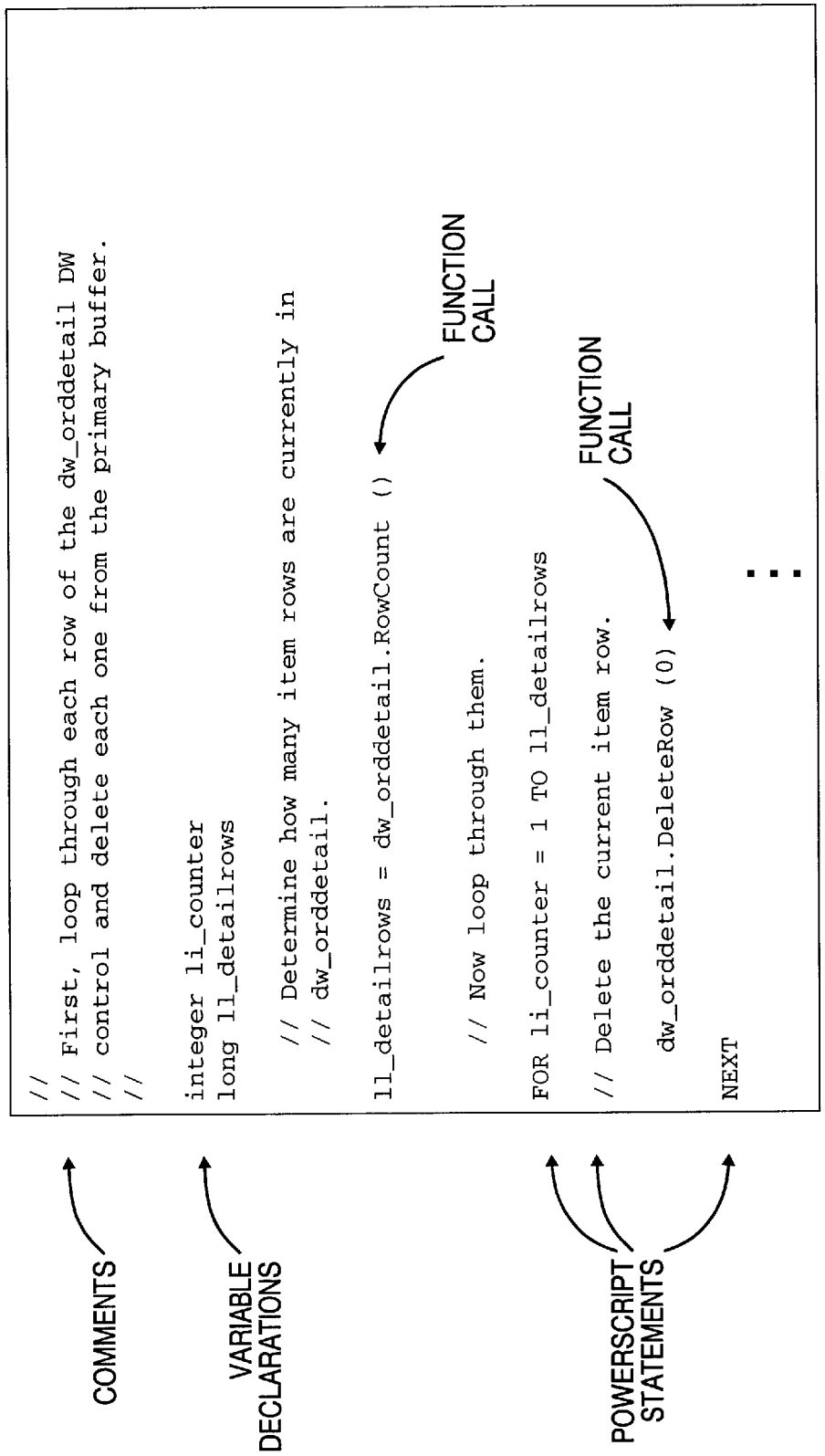

PowerScript is a high-level language that provides several different syntactic constructs a user can use to write the code he/she needs. As shown in FIGS. 11B–C, these include variable declarations, PowerScript statements, function calls (built-in and user-defined), embedded SQL statements, and comments. PowerScript supports many data types, as well as arrays and structures of variables. It also provides several levels of scoping that a user can choose from for each variable he/she declares. PowerScript statements provide flow-of-control mechanisms (such as branching and looping) that a user can use to steer the processing in a particular script. When a user creates a user-defined function, he/she specifies the arguments required (if any), a script of the code that is to execute, and the value it is to return (if any). A user can then call that user-defined function from event scripts or from other user-defined functions.

6. Mapping The Requirements of The Application

In the example of the hypothetical company, Anchor Bay Nut Company, the user would map processing requirements to development environment features as follows. The Order Entry application needs to handle a number of different events for its various windows, controls, and menus. For instance, consider the application's Customer window. To provide all of the processing for the window of FIG. 8A, for instance, scripts are required for each of the following events.

| Type of component | Name | Events that need scripts |
|---|---|---|
| Window | w_customer | Open, RButtonDown |
| CommandButton control | cb_close | Clicked |
| | cb_delete | Clicked |
| | cb_new | Clicked |
| | cb_orders | Clicked |
| | cb_retrieve | Clicked |
| | cb_save | Clicked |
| DataWindow control | dw_detail | Clicked, RowFocusChanged, Uevent_keypressed (a user event) |
| | dw_list | EditChanged, ItemChanged, ItemError |
| SingleLineEdit control | sle_lname | Modified |
| Menu item listed under File | m_new | Clicked |
| | m_retrieve | Clicked |
| | m_save | Clicked |
| | m_delete | Clicked |
| | m_printersetup | Clicked |
| | m_reviewdata | Clicked |
| | m_exit | Clicked |
| Menu item listed under Orders | m_goto | Clicked |
| Menu item listed under Guides | m_phoneprocedures | Clicked |
| | m_companypolicies | Clicked |
| | m_salescompetition inquiry | Clicked |
| | m_employee motivationa | Clicked |
| | m_employee motivationb | Clicked |
| | m_employeefun | Clicked |
| Menu item listed under Help | m_contents | Clicked |
| | m_about | Clicked |

The Order Entry application may include user-defined functions to provide additional processing services that can be called from the event scripts. For example, the application's Customer window can includes the three following user-defined functions.

| User-defined function | Purpose |
|---|---|
| wf_delcustorders | To be called whenever the user asks to delete a customer to make sure the customer does not have any outstanding orders in the database |
| wf_newcustnum | To be called whenever the user asks to add a customer to compute the next available ID number for a new customer in the database |
| wf_warndataloss | To be called at the beginning of various operations to check whether any unsaved data might be lost and to warn the user |

The wf_delcustorders function may be constructed, for examle, as shown in FIG. 11D.

With an understanding of how an application is designed in the integrated development environment of the system of the present invention, the methods of the present invention for implementing a database control object—a DataWindow—in HTML can now be better understood.

HTML Database Control Object

A. Introduction

As described above (and in above-mentioned commonly-owned U.S. Pat. No. 5,566,330), the DataWindow is a unique type of component or object used to retrieve, display, and manipulate data from a relational database or other data source. DataWindow objects have knowledge about the data they are retrieving, and present information according to user-specified display formats, presentation styles, validation rules, expressions and other data properties, so dynamic data is used in the most meaningful way. In accordance with the present invention, the following describes modification made to the DataWindow component for providing an HTML DataWindow component that is well integrated with "Web" (i.e., "World Wide Web") or hypertext technologies. The HTML DataWindow allows code-less creation and layout of forms, database queries, and result sets, automatic run-time generation of HTML and script for full range of DataWindow functionality, cross-browser HTML, with graceful degradation for older browsers, and client side validation, date formatting, subtotals and computed columns.

HTML or Hypertext Markup Language is the scripting language used to create the documents for the World Wide Web. HTML documents include formatting, graphics, and "hypertext links" to other documents. Markup languages are used to describe the structure of the, document. HTML is used to mark various elements in a document, including headings, paragraphs, lists, tables, and the like. To achieve this, an HTML document includes formatting commands or "tags" embedded within the text of the document which serve as commands to a browser. Here, HTML tags mark the elements of a file for browsers. Elements can contain plain text, other elements, or both. The browser reading the document interprets these markup tags or commands to help format the document for subsequent display to a user. The browser thus displays the document with regard to features that the viewer selects either explicitly or implicitly. Factors affecting the layout and presentation include, for instance, the markup tags used, the physical page width available, and the fonts used to display the text. Further description of HTML documents is available in the technical and trade literature; see e.g., Ray Duncan, *Power Programming: An HTML Primer*, PC Magazine, Jun. 13, 1995, the disclosure of which is hereby incorporated by reference.

B. Overview of Operation and Construction

In accordance with the present invention, a pure HTML DataWindow control is provided with the help of a Web page server (e.g., Sybase PowerDynamo™, available from Sybase, Inc. of Emeryville, Calif.) and a server component (which is invoked from that Web page server). Sybase PowerDynamo™ includes a Personal Web Server for use during development. The control is employed at design time to allow a developer to add database-driven content to his or her Web applications. In particular, using a Web or HTML DataWindow Design-Time Control (DTC) of the present intention, a developer visually drops the DataWindow onto an HTML editing surface (e.g., such as the previously-illustrated "Painters" that are displayed in PowerBuilder), and modifies the DTC properties as appropriate. Server code to create the DataWindow at runtime is then generated automatically. Client side validation defined for the DataWindow is translated into script commands (e.g., JavaScript, available from Netscape of Mountain View, Calif.) and executed on the client. JavaScript is a scripting language developed by Netscape to enable Web authors to design interactive sites. Although it shares many of the features and structures of the full Java language, it was developed independently. Javascript can interact with HTML source code, enabling Web authors to spice up their sites with dynamic content. No script commands need be written manually, however.

The HTML DataWindow serves as a thin-client DataWindow implementation for Web applications that provides most of the data manipulation, presentation, and scripting capabilities of the PowerBuilder DataWindow, without requiring any PowerBuilder DLLs on the client. DataWindow validation rules, formatting, and edit styles are converted into equivalent HTML and JavaScript. HTML is generated that is suitable for the target browser (using absolute positioning for Internet Explorer and relative positioning for Netscape). A plurality of functions and events are implemented by the generation of JavaScript which is downloaded to the client. In this manner, the Web or HTML DataWindow DTC generates a runtime DataWindow object in HTML. It offers a thin-client solution that provides most of the data manipulation, presentation, and scripting capabilities of the PowerBuilder DataWindow without requiring any PowerBuilder DLLs or plugins on the Web client. The DataWindow that displays in the Web browser looks very much like the DataWindow one-way design in the PowerBuilder DataWindow painter.

The HTML DataWindow uses a component running in a transaction server (such as Sybase Jaguar™ transaction server or Microsoft Transaction Server (MTS)) cooperating with a dynamic page server (such as Sybase PowerDynamo™ or Microsoft Active Server Pages in IIS) and communicating with a Web client via a Web server. The server component can also be called directly from the dynamic page server without a transaction server, but using a transaction server usually provides better performance (because database connections and instances of the component can be cached).

Figure 12:
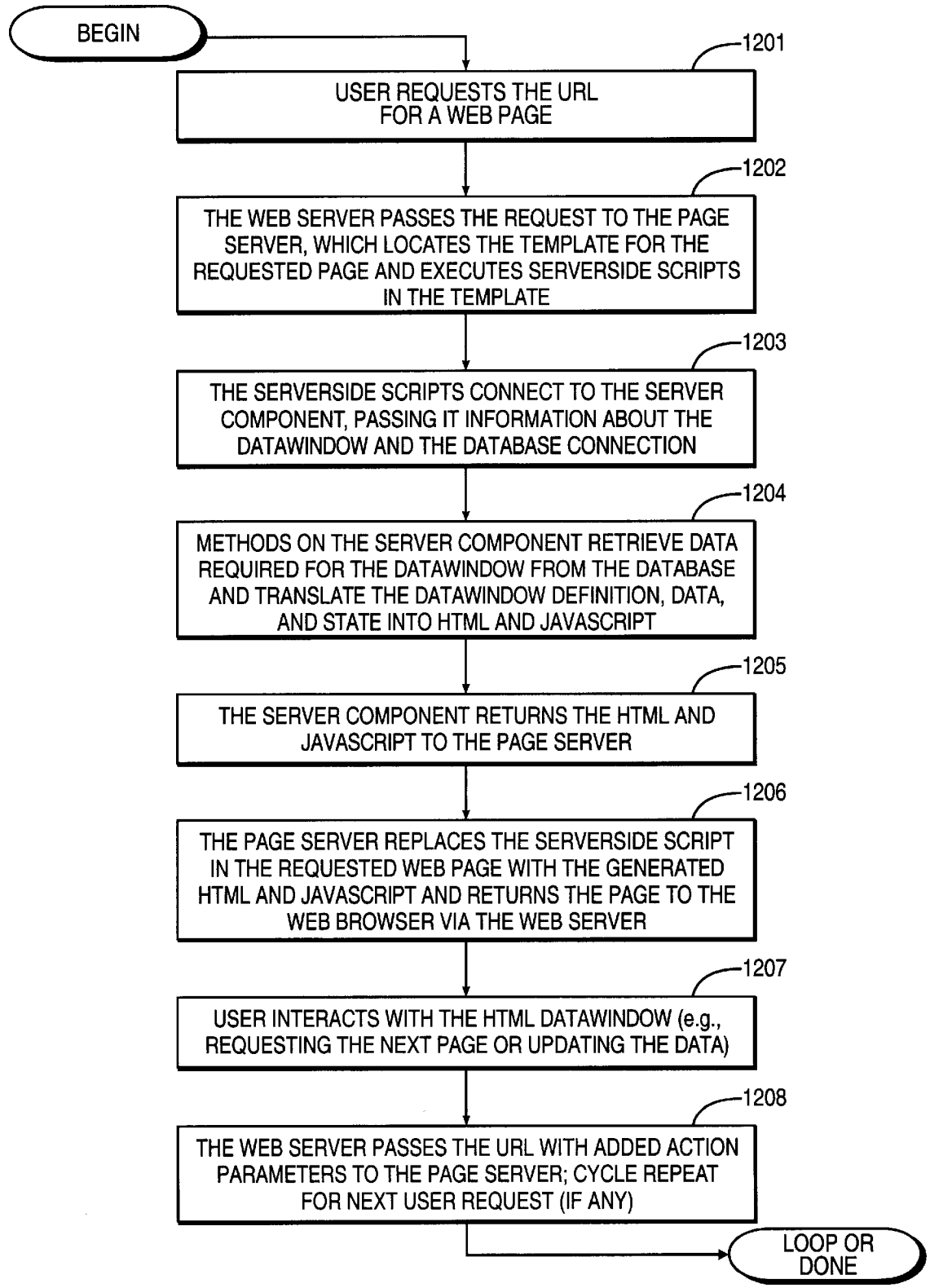
FIG. 12 is a flowchart illustrating runtime operation of an HTML DataWindow control object of the present invention.

FIG. 12 illustrates an overall method of operation of an HTML DataWindow of the present invention. First, in a Web browser, a user requests the URL for a page, as illustrated in step 1201. The Web server passes the request to the page server, which locates the template for the requested page and executes server-side scripts in the template. This is illustrated in step 1202. The server-side scripts connect to the server component, passing it information about the DataWindow and the database connection, as shown in step 1203. Methods on the server component retrieve data required for the DataWindow from, the database and translate the DataWindow definition, data, and state into HTML and JavaScript, as illustrated in step 1204. As shown in step 1205, the server component returns the HTML and JavaScript to the page server. Then, as indicated by step 1206, the page server replaces the server-side script in the requested Web page with the generated HTML and JavaScript and returns the page to the Web browser via the Web server. The user interacts with the HTML DataWindow, for example requesting the next page or updating the data. This is represented by step 1207. The Web server passes the URL with added action parameters to the page server, as shown in step 1208. The cycle begins again for the next user requests (if any).

With a basic understanding of the operation of the Web or HTML DataWindow of the present invention, its detailed construction may now be studied. Operation of the HTML DataWindow stems from cooperation of two main components: a server component and a client control. The server component retrieves data from a database and returns HTML and JavaScript that represent the data and the DataWindow object definition to the page server. In a preferred embodiment, the server component is a PowerBuilder custom class user object that uses a data store ("DataStore") to handle retrieval and updates and is deployed as a Jaguar (Sybase) or COM (Microsoft) distributed component. COM (Component Object Model) is a model for binary code developed by Microsoft that enables programmers to develop objects that can be accessed by any COM-compliant application; both OLE and ActiveX are based on COM. A DataStore is a nonvisual DataWindow control. DataStores act just like DataWindow controls except that they do not have many of the visual characteristics associated with DataWindow controls. Like a DataWindow control, a DataStore has a DataWindow object associated with it.

The server component includes methods that the developer calls in his or her Web page template to instantiate and configure the component. The HTML DataWindow client control, the other hand, represents the JavaScript and HTML that is generated by the server component and embedded in the page returned to the Web client. Client-side scripts that the developer adds to his or her Web page template and wrap in SCRIPT tags are embedded as JavaScript in the client control. Some features available on the client control are optional: events, methods, data update and validation, and display formatting for newly-entered data. The size of the generated JavaScript increases as one adds more client-side functionality. Events that are triggered on the client control and several of the client control methods do not require the server component to reload the page, so processing on the client is; typically much faster than processing performed on the server.

The HTML DataWindow control is fully generated by the server component using standard HTML and JavaScript. The generated HTML control and the page server component cooperate to provide the DataWindow functionality. The server component is written in PowerScript and deployed as an ActiveX and a server component (e.g., using Sybase Jaguar application server). The server component performs data access, optionally maintaining state and dynamically generating the HTML to render the control, with its data and state, for inclusion on a page. The generated HTML control assumes the existence of a page server and includes the current state of the DataWindow such that the server component can run in a fully stateless mode. It support navigations and optional data input, data modification, data validation, insert, delete and update. The version of the browser may be taken into account during HTML generation so that the functionality of the control will degrade as gracefully as possible.

C. Hosting and HTML DataWindow Within a Browser

The HTML DataWindow control is a cooperation between a server component that can translate a DataWindow definition, data, current state and current action into HTML and a page server that passes state and action information back to the component and includes the generated HTML into a Web page it constructs. The server component can either run directly within the page server or it can run in a component transaction server (like Sybase Jaguar or Microsoft MTS) that the page server would talk to. The server component provides for optional state management and navigation from the HTML client. It is a pure thin-client solution that requires no PowerBuilder DLL's on the client. It provides most of the functionality and look of a DataWindow control on the client. The majority of the processing occurs on the server. The advantages of this approach include providing a pure thin-client solution, working a page at a time, supporting modification and update, running all database connectivity runs on server (no client side configuration required), and providing some client side scripting and events.

D. Hosting Operation

Figure 13:
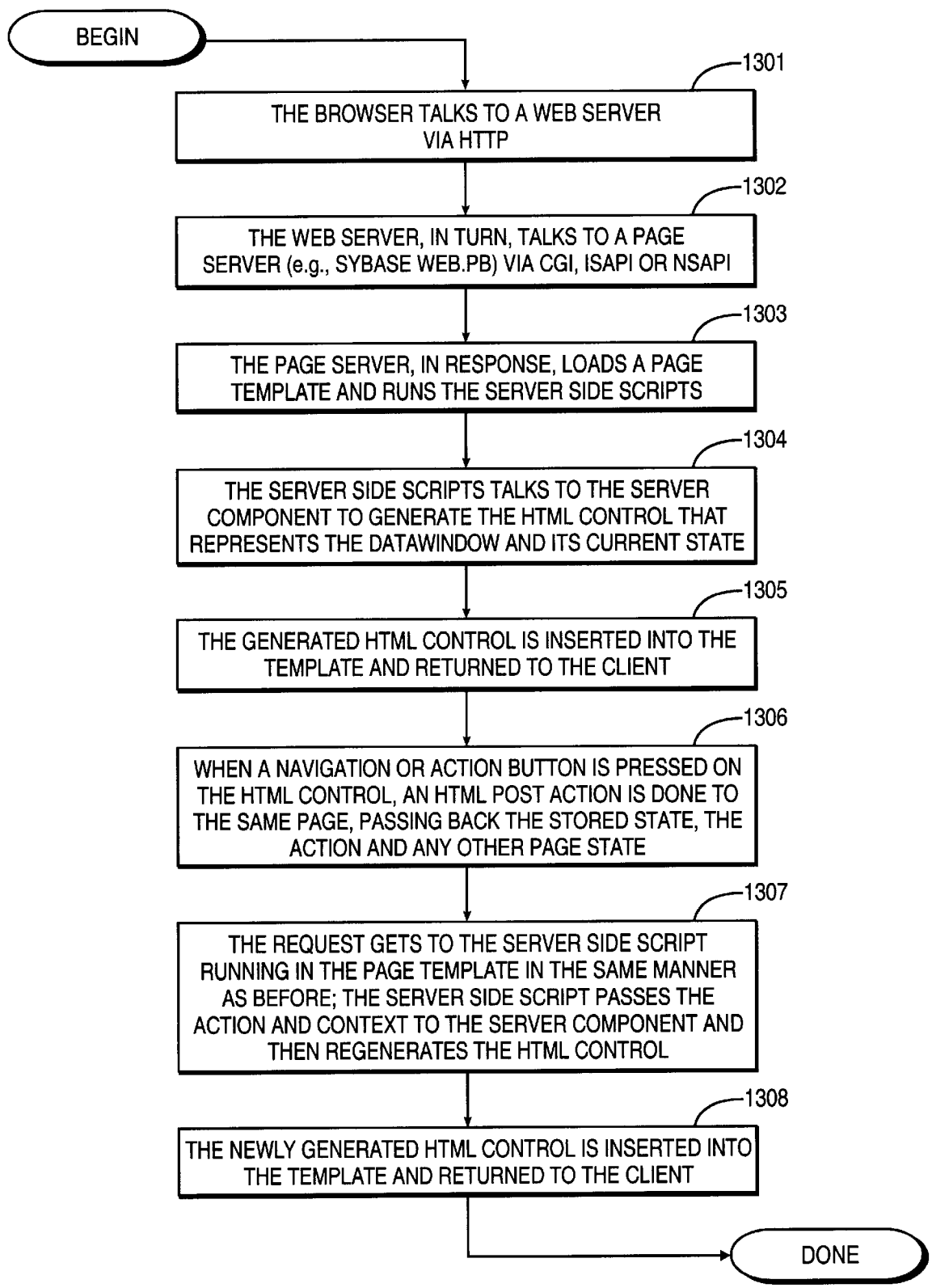
FIG. 13 is a flowchart illustrating hosting of an HTML DataWindow control object of the present invention.

Upon the first request for a page, the following hosting (communication) sequence ensues, as illustrated by FIG. 13. First, the browser talks to a Web server via HTTP, as indicated by step 1301. The Web server talks to a page server (e.g., Sybase Web.PB) via CGI, ISAPI or NSAPI, as indicated by step 1302. For an introduction to Internet communication protocols (e.g., HTTP), see e.g., William Stallings, *The Backbone of the Web*, BYTE, October 1996, the disclosure of which is hereby incorporated by reference. The page server, in response, loads a page template and runs the server side scripts, as indicated by step 1303. The server side scripts talks to the server component to generate the HTML control that represents the DataWindow and its current state, as indicated by step 1304. This generated HTML control is inserted into the template and returned to the client, as shown at step 1305. When a navigation or action button is pressed on the HTML control, an HTML POST action is done to the same page, passing back the stored state, the action and any other page state. This is illustrated by step 1306. This request gets to the server side script running in the page template in the same manner as before. The server side script passes the action and context to the server component and then regenerates the HTML control, as shown at step 1307. The newly generated HTML control is inserted into the template and returned to the client, as finally shown at step 1308.

E. Client-side HTML DataWindow Control

1. General

The control itself is implemented as a JavaScript object in an HTML form. The amount of generated code can be controlled by trading off functionality for size. The more functionality desired, the larger the size of the resulting control. The size increases with the following functionality (from smallest to largest):
1. Navigation only (no update)
2. Update, but no validation, events, formatting or client side scripting
3. Update with validation, but no events, formatting or client side scripting
4. Update with validation and events, but no formatting or client side scripting
5. Update with validation, events and client side scripting, but no formatting
6. Update with validation, events, formatting and client side scripting.

(In order to support updates, the DataWindow definition specifies editable columns.)

2. Client Side Events

The following events may be optionally supported on the client. For the client to script the event, one should either assign to the event name property of the control (e.g. dwMine.ItemError=myItemError;) or use the following naming convention: <dwControlName>_<eventName> (e.g., dwMine_ItemError). The events are the same name as the DataWindow events and expect the same return values.

Supported events in an exemplary embodiment include:
ButtonClicking(Number row, String objectName)
ButtonClicked(Number row, string objectName)
  Note: This event will only fire for buttons with a user defined (UserDefine) action. All other actions cause a page reload from the server.
Clicked(Number row, String objectName)
  Note: In the current preferred embodiment, this event is only triggered for Microsoft Internet Explore 4.0 and above (except for buttons). Because the browser event model is different from Microsoft Windows, the Clicked( ) event occurs last when clicking on a column or text object. Since PowerBuilder controls the event ordering for button clicks, the Clicked( ) event occurs on all browsers and occurs before the ButtonClicking( ) event. (same as Windows).
ItemChanged(Number row, String columnName, String newValue)
ItemError(Number row, String columnName, String newValue)
ItemFocusChanged (Number row, String columnName)
RowFocusChanged(Number newRow)
RowFocusChanging(Number currentRow, Number newRow)
UpdateStart ( )

3. Client Side Functions

In an exemplary embodiment, the following methods are (optionally) supported on the client control. The methods perform the same operation as their DataWindow counterparts. Noted functions will cause the page to be reloaded. Function that get or set data to rows will fail if the asked-for row is not cached on the client, even if it exists on the server.
AcceptText( )
DeletedCount( )
DeleteRow(Number row) (reload)
GetClickedColumn( )
GetClickedRow( )
GetColumn( )
GetNextModified(Number startRow)
  Note: This only deals with rows cached on the client side (i.e., it cannot find rows that are modified only in the saved state)
GetRow( )
GetItem(Number row, Number or String col)
GetItemStatus(Number row, Number or String col)
InsertRow(Number row) (reload)
ModifiedCount( )
Retrieve( ) (reload) (args???)
RowCount( )
ScrollFirstPage( ) (reload)
ScrollLastPage( ) (reload)
ScrollNextPage( ) (reload)
ScrollPriorPage( ) (reload)

SetItem(Number row, Number or String col, value)
SetColumn(Number or String col)
SetRow(Number row)
SetSort(String sortString)
Sort( ) (reload)
Update( ) (reload)

4. Client Side Expression Generation

If applicable, client side expressions may be generated for validation and computed fields that depend on column values. This generation does not support aggregate functions. If an expression uses an unsupported function, then it will not be generated on the client. If an unsupported function is used in a validation expression, no validation will occur. If an unsupported function used in a computed field, then the field will be evaluated on the server. A comment is generated in the generated code indicating what function caused the problem to assist in debugging.

F. Scripting

1. General

The Sybase PowerSite object model object offers an easy level of scripting (PowerSite™ is available from Sybase, Inc. of Emeryville, Calif.). If more flexibility is desired then either the developer can either connect to the server component themselves or use a regular DataWindow object to connect and use the Component property to manipulate the server component. To make specifying the connection easier in PowerSite, a Jaguar connection object is defined as well as a separate source parameter object.

2. Database Connection Parms (Parameters) Object

A database connection may be specified, using the following function invocation:

```
function PSConnectionParmsClass(String connectString = " ",
    String user = " ",
    String password = " ",
    String dbms = "ODBC",
    String lock = " ",
    String database = " ",
    String serverName = " ",
)
```

This specifies the database connection parameters, without making a connection to the database. Alternatively, one may specify a database connection based on a named connection, as follows:

function PSNamedConnectionParmsClass(String connectionName)

The above connection properties are stored differently depending on the deployment platform.

3. Server Connection Object

A Server Connection Object (e.g., Sybase Jaguar Connection Object) may be defined as follows:

```
function PSJaguarConnection(String serverName,
    String userId="Jaguar",
    String password="guest",
    String componentName="DataWindow/nv_html_data_window",
    Boolean bOneTrip = false)
```

This specifies the connection parameters to connect to a server component (e.g., running in a Sybase Jaguar server). The bOneTrip parameter indicates that the server component is acting in a stateless manner (which implies that the server component specifies which DataWindow definition to use as well as the database connection parameters in its properties).

4. Source Parameter Object

A Source Parameter Object may be defined as follows:

```
Function PSDataWindowSourceClass(String sourceFileName=null,
    String dwName=null,
    String sourceURL=null)
```

This create a new source parameter object.

This function is invoked with the following properties:

sourceURL=null
  Note: This indicates that the DataWindow definition exists in source format that is deployed in a Web server. The source will be retrieved and passed to the server component. Using this property overrides the sourceFileName and dwName parameters.

sourceFileName=null
  Note: This indicates that the DataWindow definition exists in the file system on the server. This can be a PSR or SRD. If the file name is a PBD or PBL, then the dwName needs to be specified as well. The server component will use the path on the server to find the file.

dwName=null
  Note: The name of the DataWindow definition that is in a PBL or PBD. This parameter is ignored if sourceFileName does not contain a PBL or PBD.

5. DataWindow Object

The DataWindow object itself is created with a call to the following function:

```
function PSDataWindowClass(
    String objectName = "htmlDW",
    Boolean bServerSideStateManagement = false,
    jaguarConnection = null,
    sourceLocation=null,
    dbConnection = null,
    long lPageSize = -1
)
```

This creates a new object, optionally using server side state management. If objectName is not specified or null, it defaults to "htmlDW". If sourceLocation is null, then it is expected that the server component encapsulates the identity of the source. If jaguarConnection is null, then the use of the ActiveX server component is assumed. If dbConnection is null, then it is assumed that the server side object encapsulates the database connection properties. If using server side state management, a reference to the server component will be saved and retrieved from the session object based on the object name. If lPageSize is not −1, then the generated control will contain the passed number of rows. If 0 is passed, all retrieved rows are generated. If lPageSize is −1, then the page size from the DataWindow definition will be used.

Properties include the following:

Object Component
  Note: This object property represents the reference to the server component (described below). If more advanced operations are desired, then this property can be used to access any of the server component methods.

String RetrievalArgs[ ]
  Note: This property is an array of the arguments used for retrieve. They can either be set manually or via the FillRetrievalArgs( ) method.

Available methods include:

SetColumnLink(String columnName, String link, String linkArgs, String linkTarget)

Note: This method will set up a link on the passed column. This allows for master/detail links to be easily made from within the server scripts.

FillRetrievalArgs( . . . )

Note: This methods fills the retrieval argument array based on the names of the page variables that are passed. The value of the named variables is put into the array in that order that they are passed. If the value for a variable could not be found, then "" is put in the array.

Int Generate( . . . )

Note: This function performs the house cleaning necessary to generate the HTML rendering. This includes retrieving the action context, calling SetAction( ) and generating. The generation is done inline. Any connection errors are generated inline. Any database error messages are generated inline as well. The method returns 1 if it succeeds and −1 if it fails. Even if the method fails, it could have generated output. The arguments to this function is expected to be the names of any page variables that are to be maintained when the HTML DataWindow control navigates.

SetWeight(Boolean bAllowForm=true,
  Boolean bClientValidation=true,
  Boolean bClientEvents=true,
  Boolean bClientScriptable=false,
  Boolean bClientFormatting=false)

Note: This function allows the size of the generated client to be reduced by trading off functionality. If the bAllowForm parameter is false, it will turn off bClientValidation and bClientFormatting and only allow for navigation (i.e., no modification). bClientValidation controls the generation of client side validation functions. bClientFormatting controls the generation of client side display formatting. bClientEvents controls the invoking of client side events. A scriptable client with client side formatting is the heaviest weight (but is still less than the average image), but provides the most functionality.

Example of Use with ActiveX:
  Var dwName=psDocument.GetParam("dwName");
  Var dwParm=new PSDataWindowSourceClass("x.pbl", dwName);
  Var dwMine=new PSDataWindowClass("dwMine", null, dwParm, dbConn);
  dwMine.Generate("dwName");

Example of Use With Jaguar:
  Var jagParm=new PSJaguarConnection ("myserver:9000");
  Var dwMine=new PSDataWindowClass("dwMine", jagParm);
  dwMine.Generate( );

Example of Use With PowerDynamo:
  Var jagParm=new PSJaguarConnection ("myserver:9000");
  Var dwParm=new PSDataWindowSourceClass ( );
  dwParm.sourceURL="xyz.srd";
  Var dwMine=new PSDataWindowClass("dwMine", jagParm, dwParm);
  dwMine.Generate( );

G. Server Component

1. General

The server component is a single component that is deployed to a particular component model. For instance, the component may be built using PowerScript and deployed as an ActiveX component and as a Jaguar component. These two component models will allow for the HTML DataWindow control functionality to be open to any page server that supports ActiveX or Java. Sybase PowerDynamo and other Java based servers talk to a Sybase Jaguar Server using Jaguar Java stubs. Microsoft ASP talks directly to the ActiveX or to the ActiveX hosted in MTS, and may also talk to the Jaguar component using Jaguar's ActiveX stub. The interface of this component is intended for ease of use.

2. Component Interface

The following component interface is provided.

```
Interface HTMLDataWindow
    String Create(String dwSyntax)
    String Describe (String describeSyntax)
    String Generate()
    Long GetLastError()
    String GetLastErrorString()
    Int Modify(String modifySyntax)
    Int Retrieve()
    Int RetrieveEx(string args)
    Int SetAction(String action, String context)
    String SetBrowser (String browserName)
    String SetColumnLink (String columnName,
        String link,
        String LinkArgs,
        String linkTarget)
    Int SetDWObject (string sourceFileName, string dwObjectName)
    String SetHTMLObjectName(String objectName)
    String SetPageSize(long lPageSize)
    String SetSelfLink(String selfLink, String selfLinkArgs)
    String SetServerSideState(boolean bMaintainState)
    Int SetTrans (String dbms,
        String dbparm,
        String lock,
        String logid,
        String logpass,
        String database,
        String servername)
    Int SetWeight(Boolean bAllowForm,
        Boolean bValidation,
        Boolean bEvents,
        Boolean bClientScriptable,
        Boolean bClientFormatting)
    Int Update()
    String OneTrip(String browserName,
        String SelfLink,
        String SelfLinkArgs,
        String action,
        String context)
    String OneTripEx(String args[ ],
        String browserName,
        String SelfLink,
        String SelfLinkArgs,
        String action,
        String context)
End Interface
```

3. Component Method Descriptions

The following methods are defined.

String Create(String dwSyntax)

Creates an in memory DataWindow binary based on the passed DataWindow syntax. It is expected that the source definition for the DataWindow is either embedded in the page or referenced from the Web site using the capabilities of the scripting engine in the page server. The return value is "" if it succeeds and the compile errors if it fails to compile.

String Describe (String describesyntax).

This allows the properties of the underlying DataWindow definition to be queried.

String Generate( )

This returns an HTML rendering of the current page of the DataWindow. The page is changed as a result of SetAction( ). The properties that have been set will determine the form of the HTML. Page Headers, Page footers, Group Headers, Group Trailers and the summary band will all be rendered if applicable. Buttons will be rendered as buttons. Any columns that have a tab order and are not protected, will generate input elements of the correct type. If possible, validation rules will be generated in client side script to validate the data entered before it gets sent to the server. See below for other changes to the HTML generation.

Long GetLastError( )

Gets the error code of the last error that occurred.

String GetLastErrorString( )

Gets a textual representation of the last error that occurred.

String Modify(String modifySyntax)

This allows the properties of the underlying DataWindow definition to be modified. It returns"" if it succeeds and an error message if it fails.

Int RetrieveEx(String args)

Retrieves the data from the database into the DataWindow. If the DataWindow expects arguments, then they must be passed to RetrieveEx( ). Overloading and varargs was not used because they are not supported in all component models. The return value is the same as the DataStore.Retrieve( ). The args string is expected to encode all the arguments in a single string, separated by newlines (\n) characters. The retrieval arguments cannot contain embedded newlines! A maximum of 16 arguments is supported.

Example:

"abc\ndef" is passing two arguments "abc" and "def".

Int SetAction(string Action, String context)

Tells the HTMLDW about an action taken on the client and applies any changes that were made on the client side. This is the function that links the generated HTML to the component. When a navigation or action is performed in the generated HTML, the action and the current state is passed to the server side script in the <ObjectName>_action variable and the <ObjectName> context variable. The server side script should extract the values of these variables and call this function. The state is then restored and the action taken to change the state. This new state is maintained in the newly generated HTML.

String SetBrowser(String browserName)

This function provides an easy way to set the name of the browser. It is equivalent to calling:

Modify("datawindow.htmlgen.browser= '<browserName>'").

String SetColumnLink(String columnName,

String link,

String LinkArgs,

String linkTarget)

Allows: the page server script to easily set up a 2 page, master/detail relationship. See the description of the DataWindow property for the proper format of the linkArgs parameter. The linkTarget parameter allows the link to be used with frames.

SetDWObject (string sourceFileName, string dwObjectName)

If the source file name is a PBL or PBD, the dwObjectName parameter specifies name of DataWindow within the passed library. The library is located in the file system on the machine that is hosting the component using the standard search mechanisms. If the name has an SRD extension then the file is expected to be a source definition that will be dynamically compiled. If the name has a PSR extension, then both the definition and the data are retrieved from the file. In the latter two cases, the dwObjectName is expected to be "" and the file is located in the file system on the machine that is hosting the component using the standard search mechanisms.

String SetHTMLObjectName(Sting objectName)

This function provides an easy way to set the name of the HTML DataWindow control. The name is used in client side callback scripts as well as identifying the elements during generation. It is equivalent to calling:

Modify("datawindow.htmlgen.ObjectName= '<objectName>'").

String SetPageSize(long lPageSize)

This function provides an easy way to set the page size. It is equivalent to calling:

Modify("datawindow.htmlgen.PageSize= '<lPageSize>'")

String SetselfLink(String selfLink, String selfLinkArgs)

This function provides an easy way to set the name of the current page. It is equivalent to calling:

Modify("datawindow.htmlgen.SelfLink='<selfLink>'") and/or

Modify("datawindow.htmlgen.SelfLinkArgs= '<selfLinkArgs>'").

String SetServerSideState(boolean bMaintainState)

This function tells the server component if it should attempt to maintain its state. It is really only needed for the Jaguar server component, but is supported everywhere. The server component will attempt to maintain the retrieved data until this is turned off or the server component goes away.

Int SetWeight(Boolean bAllowUpdate,

Boolean bValidation,

Boolean bEvents,

Boolean bClientScriptable,

Boolean bClientFormatting)

This function provides an easy way to control the weight of the generated control. If bAllowUpdate is false, then bValidation and bClientFormatting are ignored.

String Update( )

This function forces any outstanding modifications to be written to the database. This allows for script level control of when updates happen. Updates can also occur if the DataWindow definition contains a button with the Update action and the client presses the button.

String OneTrip(String objectName,

String SelfLink,

String SelfLinkArgs,

String Browser,

String action,

String context)

String OneTripEx(String objectName,

String args[ ],

String SelfLink,

String SelfLinkArgs,

String Browser,

String action,

String context)

These functions wrap the functionality of Modify( ), Retrieve( ), SetAction( ) and Generate( ) in a single function. It is designed for use with a Jaguar component that has been previously configured with the DataWindow definition and the transaction information (See how to do this below). This would reduce the number of round trips to the Jaguar server and allow the HTMLDataWindow component to act as a stateless component within Jaguar. The server side script to use this would be:

```
// create component on server
    ...
    var action = psDocument.GetParam("dwMine_action");
    var context = psDocument.GetParam ("dwMine_context");
    if (action == null) {
       action = " ";
       context = " ";
    }
    var browser = psDocument.getEnv ("HTTP_USER_AGENT");
    var selfLink = psDocument.GetEnv("SCRIPT_NAME");
    psDocument.Write(dwMine.Component.OneTrip("dwMine",
selfLink, " ", browser, action, context));
```

4. State Management

The HTML generation is designed to run in a fully stateless server environment. Doing so has some performance implications. The state of the DataStore must be maintained on the client in string form, which means it must be sent back and forth with every request. Also, since there is no state maintained on the server, the component must connect to the database and do a retrieve on every round trip. (NOTE: If the component server does not do connection caching, then the performance could be really bad.)

The cost of maintaining the client side state is minimal when there have been no modifications. The size of the client side state grows proportionally to the number of outstanding changes that have not been updated to the database. If this is a big problem, having the server scripts frequently call update on the component can minimize the amount of outstanding modifications.

To minimize the performance hit of constantly retrieving the data, the a reference to the server component can be maintained in the page server's session object. If using Jaguar, it would be important to mark the component as a stateful object as well. This will provide rapid turn around time if the same component was accessed again. However, this would result in increasing the resource cost on the server for each client connection. The resource cost could be reduced if a short time out is put on the session. Coupling this with the client side state management would provide a robust environment, as the state would not be lost when the session times out.

H. Transaction Server (e.g., Sybase Jaguar) Component Information

A generic transaction server (Sybase Jaguar) component is provided ("DataWindow/HTMLDataWindow") that can be used to access any DataWindow and generate HTML for it. This will require multiple round trips to the server from the client. For better scalability, the Jaguar component is designed such that some of the properties (like the DataWindow and library) can be set in advance. This would allow the page server to simply talk to a Jaguar component and have the properties encapsulated in the component definition from within Jaguar Manager. This also allows the component to effectively take part in Jaguar's instance pooling. The DataWindow definition can be loaded when the instance is created and shared from then on. If the property is not set, then it is expected that a function call would to be called on the component to set the corresponding information.

The user settable Jaguar component properties are:

| Property | API Function |
|---|---|
| com.sybase.datawindow.sourceFileName | SetDWObject() |
| com.sybase.datawindow.dwObjectName | SetDWObject() |
| com.sybase.datawindow.fixed | yes or no |
| | disables SetDWObject(), |
| | Create(), |
| | Modify(), |
| | SetTrans() |
| com.sybase.datawindow.serverSideState | yes or no |
| | indicates if result set is |
| | maintained |
| | transaction is not closed |
| | down |
| com.sybase.datawindow.trace | yes or no |
| | Traces API calls to the |
| | jaguar server log. |
| com.sybase.datawindow.HTMLObjectName | SetHTMLObjectName() |
| com.sybase.datawindow.modifyString | Modify() |
| com.sybase.datawindow.trans.dbms | SetTrans() |
| com.sybase.datawindow.trans.dbparm | SetTrans() |
| com.sybase.datawindow.trans.lock | SetTrans() |
| com.sybase.datawindow.trans.logid | SetTrans() |
| com.sybase.datawindow.trans.logpass | SetTrans() |
| com.sybase.datawindow.trans.database | SetTrans() |
| Com.sybase.datawindow.trans.servername | SetTrans() |

A custom component may be set up as follows.

1) Use Jaguar Manager to create a new PowerBuilder component
2) Use "DataWindow::HTMLGenerator" for the IDL interface
3) PowerBuilder Class Name: nv_remote_datawindow
4) PowerBuilder Library List: pbdwr70.pbd
5) PowerBuilder Application: remote_datawindow_appl
6) Switch to the "All properties" tab
7) Click on the "Add" button to add any of the properties you wish
8) The component is now ready to be used from a client.

The implementation of the component is provided with the PowerBuilder runtime. If the HTMH)W.trans.dbms property is added, then any other trans property that is not specified, defaults to "". The trans.dbms property must be set, for any other trans property to be looked at.

I. EXAMPLES

1. Sybase PowerDynamo Usage Example

The following is an example of how the server component could be used within Sybase PowerDynamo connecting to the Sybase Jaguar server component.

```
dwMine = CreateObject ("DataWindow.HTMLGenerator");
var retVal
if (typeof dwMine == "object")
    {
    var sComponentName = "DataWindow/HTMLGenerator"
    dwMine.Username = "jagadmin";
    dwMine.Password = " ";
    dwMine.Host = "localhost:9000";
    dwMine.Name = sComponentName;
    dwMine.Initialize();
    jagError = site.GetErrorInfo ();
    if (jagError != " ")
        {
        newComponent = null;
        HTDW_DocWrite ("Error creating Jaguar component ' " + sComponentName +
            ' " ' " + jagError + " ' <BR>\n");
        }
    else
        {
        retVal = dwMine.SetDWObject ("htgenex.pb1", "d_tabular_dept")
        if (retVal == 1)
            {
            // set up static args
            dwMine.SetBrowser (document.GetServerVariable ("HTTP_USER_AGENT"));
            dwMine.SetHTMLObjectName ("dwMine");
            dwMine.SetTrans ("ODBC",
                "ConnectString= ' DSN=EAS Demo DB V3;UID=dba;PWD=sql' ",
                " ", " ", " ", " ", " ")
            retVal = dwMine.Retrieve()
            if (retVal < 0 )
                {
                Response.Write ("************ Error on Retrieve: + " + retVal + "<BR>")
                Response.Write (dwMine.GetLastErrorString() + "<BR>")
                Response.Write ("********************<BR>")
                }
            // Check if we need to perform the action
            var dwMine_action = GetParam("dwMine_action");
            var dwMine_context = GetParam("dwMine_context");
            if ("undefined" != " " + dwMine_action)
                {
                retVal = dwMine.SetAction (dwMine_action, dwMine_context);
                if (retVal < 0 )
                    {
                    Response.Write ("************ Error on SetAction(): " + retVal + "<BR>")
                    Response.Write (dwMine.GetLastErrorString() + "<BR>")
                    Response.Write ("********************<BR>")
                    }
                }
            // set page specific properties
            dwMine.SetSelfLink (document.name, " ");
            dwMine.SetWeight (true, true, true, true)
            document.Write( dwMine.Generate() );
            }
        else
            document.Write ("SetDWObject failed " + retVal + "<BR>");
        }
    }
else
    document.Write ("Component creation failed!!! <BR>");
```

2. Microsoft ASP Usage Example

The following is an example of how this component could be used within IIS without doing state management. The major difference between it and the PowerDynamo example above is in the object creation.

```
//
// This example uses the COM server component directly
//
// It is a generic template which expects the DataWindow name
// to view to be passed as a Query or form variable.
//
```

-continued

```
// Create the object
dwMine = Server.CreateObject ("PowerBuilder.HTMLDataWindow");
// determine the dataWindow name
var dwMine_pbl = "htgenex.pbl";
var dwMine_name = Request.QueryString("name");
if (dwMine_name + " " == "undefined")
    dwMine_name = Request.Form("name");
if (dwMine_name + " " == "undefined")
    dwMine_name = "d_tabular_emp";
var retVal
retVal = dwMine.SetDWObject (dwMine_pbl, dwMine_name)
if (retVal == 1) {
    // set up static args
    retVal = dwMine.SetHTMLObjectName ("dwMine");
    var browser = Request.ServerVariables("HTTP_USER_AGENT");
    retVal = dwMine.SetBrowser(browser);
    var selfLink = Request.ServerVariables("SCRIPT_NAME");
    var selfLinkArgs = "name='\" " + dwMine_name + "\" ' ";
    retVal = dwMine.SetSelfLink (selfLink, selfLinkArgs);
    // set transaction properties (ConnectObject is required for ASP!)
    connStr = "ConnectString=' DSN=EAS Demo DB V3; UID=dba;PWD=sql'," +
              "ConnectOption= ' SQL_DRIVER_CONNECT, SQL_DRIVER_NOPROMPT' "
    dwMine.setTrans("ODBC", connStr, " ", " ", " ", " ", " ")
    retVal = dwMine.retrieve()
    if (retVal < 0 ) {
        Response.Write ("******************** Error on Retrieve: " + retVal + "<BR>")
        Response.Write (dwMine.GetLastErrorString() + "<BR>")
            Response.Write ("********************<BR>")
    }
    // Check if we need to perform the action
    var dwMine_action = Request.Form("dwMine_action");
    var dwMine_context = Request.Form("dwMine_context");
    if (dwMine_action + " " != "undefined") {
            retVal = dwMine.SetAction (dwMine_action, dwMine_context);
            if (retVal < 0 ) {
        Response.Write ("******************** Error on SetAction() : " + retVal + "<BR>")
        Response.Write (dwMine.GetLastErrorString() + "<BR>")
        Response.Write ("********************<BR>")
        }
    }
    // generate the HTML DataWindow
    Response.Write( dwMine.Generate() );
} else {
    Response.Write ("******************** Error on SetDWObject() = " + retVal + "<BR>")
{
```

3. Web.PB Usage Example

Web.PB provides the distributed computing capabilities of PowerBuilder to the Web, thus making it possible for Web browsers to invoke the services of distributed objects. In this manner, Web.PB enables HTML documents to take advantage of the power and sophistication of PowerBuilder's database access technology and scripting language. The following is an example of a function that would be invoked from Web.PB that uses an nv_html_data_window component. Notice the dwfoo_action and dwfoo_context parameters to do state management and the http_user_agent parameter to do browser specific generation. It loads the definition from source on disk and call's the create( ) method. It expects to be invoked as:

```
' http: //<computer>/scripts/pbcgi70.exe/htmldw/nv_webpb_comp/f_htmldw?name=<dwname> '
public function string f_htmldw
    (string name,
        string dwfoo_action,
        string dwfoo_context,
        string http_user_agent)
string 1s_htmlpage
string ls_filename, ls_syntax, ls_result
integer li_result
nv_remote_dataWindow inv_htmldw
string ls_selfpage = "f_htmldw"
if not IsNull(name) then
    ls_filename = name + ".srd"
else
    ls_filename = "d_grid_emp.srd"
end if
ls_htmlpage = "<HTML><HEAD>~r~n"
```

-continued

```
ls_htmlpage += "<TITLE>My test for " + ls_filename +"</TITLE>~r~n"
ls_htmlpage += "</HEAD>~r~n"
ls_htmlpage += "<BODY>~r~n"
if FileExists (ls_filename) then
    ls_syntax = ReadFile (ls_filename)
    inv_htmldw = create nv_remote_datawindow
    ls_result = inv_htmldw.create (ls_syntax)
    if ls_result = " " then
        inv_htmldw.setTrans ("ODBC",
            "ConnectString= ' DSN=Powersoft Demo DB V6;UID=dba; PWD=sql " ",
            " ", " ", " ", " ", " ")
            li_result = inv_htmldw.retrieve()
    else
        ls_htmlpage += "Create failed ' " + ls_result + " '<BR>~r~n"
    end if
else
    ls_htmlpage += "File not found: ' " + ls_filename + " '<BR>~r~n"
end if
if not IsNull(dwfoo_action) then
    li_result = inv_htmldw.SetAction (dwfoo_action, dwfoo_context)
    if li_result < 0 then
        ls_htmlpage += "****** ERROR calling SetAction() " + string(li_result) + "<BR>~r~n"
        ls_htmlpage += "****** " + inv_htmldw.GetLastErrorString() + "<BR>~r~n"
    end if
end if
if IsValid (inv_htmldw) then
    // the name MUST be dwFoo because that's what our args are expecting
    inv_htmldw.SetHTMLObjectName ("dwFoo")
    inv_htmldw.SetSelfLink (ls_selfpage)
    // we want to keep passing the 'name' arguments when performing actions
    inv_htmldw.SetSelfLink_Args ("name='" + name + " ' ")
    inv_htmldw.SetBrowser (http_user_agent)
    ls_htmlpage += inv_htmldw.Generate()
end if
ls_htmlpage += "</BODY>~r~n"
ls_htmlpage += "</HTML>~r~n"
return ls_htmlpage
end function
```

4. PowerScript Usage (a) General

The HTML DataWindow control generation is supported from PowerScript; the server component is written as a PowerScript non-visual object (nvo). This allows advanced users to have the fullest possible control over generation and the state of the DataStore. Working directly with a DataStore is intended to be an advanced feature and probably does not need to be as fully documented as working on the other three levels.

(b) PowerScript Changes

DataWindow and DataStore have the SetHTMLAction( ) method added:

integer SetHTMLAction(String action, String context)

This function is the link between the generated HTML and the DataStore/DataWindow. This function restores the state of the DataWindow based on the passed context and then changes the state based on the passed action. The function is intended solely for use in conjunction with the HTMLDW generation code. The generated HTML will have action and context strings that are tied to the <ObjectName>_action variable and the <ObjectName>_context variable. It is expected that when an action occurs, the contents of these variables will be passed to the SetHTMLAction( ) method. The format of the context string is not documented as we reserve the right to change the format, as necessary. If the function succeeds, 1 is returned. If reloading the current context fails, −1 is returned. If performing the action fails, −2 is returned. If the action cannot be performed (e.g. an Insert action when there are no editable fields), −3 is returned.

(c) DataWindow HTML Generation

The following properties are added to the DataWindow definition:

DataWindow.HTMLDW
DataWindow.Data.HTML
<column>.HTML.Link (exp)
<column>.HTML.LinkTarget (exp)
<column>.HTML.LinkArgs
<compute>.HTML.Link (exp)
<compute>.HTML.LinkTarget (exp)
<compute>.HTML.LinkArgs
<text>.HTML.Link (exp)
<text>.HTML.LinkTarget (exp)
<text>.HTML.LinkArgs
<picture>.HTML.Link (exp)
<picture>.HTML.LinkTarget (exp)
<picture>.HTML.LinkArgs
HTMLGen.Browser
HTMLGen.HTMLVersion
HTMLGen.GenerateJavaScript
HTMLGen.PageSize
HTMLGen.SelfLink
HTMLGen.SelfLinkArgs
HTMLGen.ObjectName
HTMLGen.ClientEvents
HTMLGen.ClientValidation
HTMLGen.ClientComputedFields HTMLGen.ClientFormatting
HTMLGen.ClientScriptable
The properties operate as follows.
DataWindow.HTMLDW="no"

This indicates if the DataWindow is being run in HTMLDW mode. By default it runs in 6.0 compatibility mode. If affects the algorithm used to do HTML generation. For 6.0 compatible HTML generation this flag should be off. The SetHTMLAction( ) function is only valid when this is turned on.

DataWindow. Data.HTMLTable (Read only)

The generation is modified to take the HTMLDW flag into consideration as well as allowing the <Browser> and/or <HTMLVersion> to use absolute positioning to render the output. The output will always be ReadOnly. If the HTMLDW flag is on, then only <PageSize> rows will be rendered and any navigation buttons defined in the DataWindow will be rendered as well.

DataWindow. Data.HTML (Read only)

This read only property will generate the HTML syntax for the current DataWindow. It is analogous to the DataWindow.Data.HTMLTable property except it could generate a form. It will generate a form only if HTMLDW is on, the DataWindow is not in print preview mode and there are columns that have a non-zero tab order. Otherwise, it will generate a read only rendering (see Data.HTMLTable). For compatibility with 6.0 form generate, continue to use GenerateHTMLForm( ). The returned string will contain everything required to render the HTMLDataWindow within the browser including a style sheet, data values, input elements, validation scripts, navigation elements as well as the current state (if modified). The navigation elements will pass the persisted and changed state back to the page in <ObjectName>_action and <ObjectName>_context. They will also pass back any variables defined in the SelfLinkArgs property.

<column>.HTML.Link (exp) or <compute>.HTML.Link (exp) or <text>.HTML.Link (exp) or <picture>.HTML.Link (exp)

This is a URL (with or without parameters) that is used to generate a link for each row of the particular column. The text of the link will be the value of the column. If the URL already contains parameters, more parameters may be appended at generation time.

<column>.HTML.LinkTarget (exp) or <compute>.HTML. LinkTarget (exp) or <text>.HTML.LinkTarget (exp) or <picture>.HTML. LinkTarget (exp)

This is a reference to a target frame or window that is used to as part of the generated link for each row of the particular column. If NULL or "", then no TARGET option will be generated. When the link is clicked on, the target frame or window will change. This will allow for relatively easy master/detail set ups.

<column>.HTML.LinkArgs="" or <compute>.HTML.LinkArgs="" or <text>.HTML.LinkArgs or <picture>.HTML.LinkArgs This is a string of the form "<argName>='<expr>' [|<argName>='<expr>']...". The argument expressions are evaluated, URL encoded and appended with the name to the HTMLink URL to form the final link URL for this item in the row. The expression can be any valid DW expression.

HTMLGen.Browser=""

Indicates the target browser and browser version. This property expects a string in the from that the Web server would get in a page property. This MAY be used to optimize the form of the HTML that is generated to reflect the user's browser. If not specified or if it is an unknown browser, then portable HTML, based on the HTML Version and GenerateJavaScript properties will be generated. This may lead to a loss in fidelity or functionality. We plan to only generate browser specific code for Microsoft IE and Netscape. The string should be in the form that is retrieved from an HTTP header.

HTMLGen.HTMLVersion="3.2"

This is the version of HTML to generate. This would be overridden if the HTMLGen.Browser is recognized. HTML recognized include 3.2 and 4.0.

3.2: style sheets, no absolute positioning, no regular expressions 4.0: style sheets, absolute positioning, regular expressions HTMLGen.GenerateJavaScript=yes This indicates if JavaScript can be generated if we don't recognize the browser. Functionality is dramatically reduced if no scripts can be generated. Since updates depend on scripts, this implies that the ability to do updates is not supported without client side JavaScript. Navigation links will still be supported. This property is overridden if the HTMLGen.Browser is recognized.

HTMLGen.PageSize=0

This is the number of rows that make up a virtual "page" when generating HTML and the HTMLDW flag is on. 0 indicates all rows, implying a single page. If the HTMLDW flag is off, then all rows will be generated as a single page. (Matching 6.0 HTML generation behavior).

HTMLGen.SelfLink=""

This is the URL (with or without parameters) that is used to reference the same page again. It is used in the generation of navigation buttons. If the URL already contains parameters, more parameters may be appended at generation time.

HTMLGen.SelfLinkArgs=""

This is string of the form "<argName>='<expr>' [|<argName>='<expr>']...". The argument expressions are evaluated, and placed as hidden input fields in the navigation form. The expression can be any valid DW expression. This is used so that other page specific state can be maintained when the HTMLDW navigates (like retrieval args).

HTMLGen.ObjectName=""

This is the name used when generating a form for the DataWindow. This name is used as a prefix for the input element and is also used to generate the callback function names for event callbacks. It allows for more than 1 HTMLDW to be on an HTML page at a time.

The following properties affect the weight of the client. By default we pick a medium weight, with client side events, validation, formatting and computed fields, but not enabling client side scripting.

HTMLGen.ClientEvents=yes

Indicates if code to trigger events is generated. The events that are available are discussed above.

HTMLGen.ClientValidation=yes

Indicates if validation expressions are translated to JavaScript. Datatype validation is always supported. If the expression contains restricted functions, then it will not be translated.

HTMLGen.ClientComputedFields=yes

Indicates if computed fields that reference column data are translated to JavaScript. If the expression does not reference column data or contains aggregates or restricted functions, then it will be evaluated on the server side.

HTMLGen.ClientFormatting=yes

Indicates if client side display formatting is performed. This is not yet supported and may get dropped from the 7.0 release based on time. If it is supported, it would work similar to the way it does today, the format would be used when the control does not have focus.
HTMLGen.ClientScriptable=no This is a relatively heavy weight option that provides the ability for client side JavaScript to operate on the control. The methods that are available are discussed above.

Appended herewith is Appendix A, *Using the PowerBuilder Internet Tools* (Parts 1, 2, and 3), and Appendix B, *DataWindow Programmer's Guide* (Chapter 6: *Using the Web DataWindow*), which are available from Sybase, Inc. and which provide further description of the present invention, the disclosures of which are hereby incorporated by reference.

While the invention is described in some detail with specific reference to a single preferred embodiment and certain alternatives, there is no intent to limit the invention to that particular embodiment or those specific alternatives. For instance, although the preferred embodiment has been described in terms of operating on the World Wide Web ("Web") portion of the Internet, those skilled in the art will appreciate that the teachings of the present invention are equally applicable to other distributed environments. Thus, the true scope of the present invention is not limited to any one of the foregoing exemplary embodiments but is instead defined by the appended claims.

What is claimed is:

1. A method for providing a Web-based database control object, the method comprising:

at design time, creating a definition of a Web-based database control object based on input of a developer user for visually dropping a data window design time control object corresponding to said Web-based database control object onto an HTML editing surface and using said data window design time control object for receiving input of the developer user for modifying properties of said Web-based database control object as appropriate for data access;

receiving at a Web server a request from an end user's Web browser for a particular Web page;

passing the request to a page server;

at the page server, locating a Web page template for the requested Web page, said Web page template including a definition of the Web-based database control object;

executing server-side scripts in said Web page template, said server-side scripts establishing a connection to a server component and passing to the server component information about said Web-based database control object;

at the server component, performing substeps of:
establishing a connection with a database,
retrieving data required for said Web-based database control object from the database,
based on said definition of said Web-based database control object, generating hypertext markup language and script commands for rendering said Web-based database control object at the end user's browser, and
returning said generated hypertext markup language and script commands to the page server;

at the page server replacing the server-side script in the requested Web page with the generated hypertext markup language and script commands; and returning the page to the end user's Web browser, said page rendering said Web-based database control object with data from said database, such that rendering said Web-based database control object in the end user's Web browser occurs without requiring a runtime library at the end user's Web browser.

2. The method of claim 1, wherein said hypertext markup language comprise HTML.

3. The method of claim 1, wherein said script commands comprise JavaScript.

4. The method of claim 1, wherein said definition of said Web-based data control object includes information specifying data and a state for said Web-based database control object.

5. The method of claim 1, wherein said database comprises an SQL database.

6. The method of claim 5, wherein specifying said data includes specifying an SQL query for fetching data from said database.

7. The method of claim 1, further comprising:
receiving end user input for interacting with said Web-based database control object.

8. The method of claim 7, wherein said end user input includes end user input for manipulating said data.

9. The method of claim 8, wherein said manipulating said data includes updating said data.

10. The method of claim 1, further comprising:
receiving another request from the end user's Web browser for a new Web page; and
repeating said method for the new Web page.

11. The method of claim 1, wherein said script commands include client-side validation rules defined for the Web-based database control object.

12. The method of claim 1, wherein said database comprises a set of database tables residing on a server.

13. The method of claim 12, wherein said data being retrieved comprises database rows selected from said set of database tables.

14. The method of claim 1, wherein rendering of said Web-based database control object includes displaying a graphical user interface for the object.

15. The method of claim 1, wherein said step of generating hypertext markup language and script commands for rendering said Web-based database control object at the end user's browser is performed automatically without coding by the developer user.

16. A development system providing a Web based database control object that allows an end user to manipulate, from an HTML browser, data that resides in a database, said development system comprising:

program logic for defining at design time a Web-based database control object definition, said definition based at least in part on a developer visually dropping a data window design time control object corresponding to said Web-based database control object onto an HTML editing surface and based in part on a developer using said data window design time control object to set properties of said Web-based database control object, said definition including specification of retrieval of information from the database;

program logic for generating at runtime, based on said Web-based database control object definition, HTML and script commands for rendering a user interface for displaying said information specified by said Web-based database control object in an HTML browser, including generating said user interface in accordance with a presentation style specified in said Web-based database control object and displaying said information from said database in said user interface;

wherein said HTML and script commands provide, at least in part, runtime program logic that allows the end user to make modifications to said information displayed in said user interface by said Web-based database control object;

wherein said HTML and script commands provide, at least in part, runtime program logic that allows the end user to apply said modifications to said database; and wherein displaying said information specified by said Web-based database control object in the HTML browser occurs without requiring a runtime library at the HTML browser.

17. The system of claim 16, wherein said script commands comprise JavaScript.

18. The system of claim 16, wherein said definition of said control object includes information specifying data and a state for said control object.

19. The system of claim 16, wherein said database comprises an SQL database.

20. The system of claim 19, wherein specification of data for said control object includes specification of an SQL query for fetching data from said database.

21. The system of claim 16, further comprising:

user input means for interacting with said control object.

22. The system of claim 21, wherein said user input means includes user input means for manipulating said data.

23. The system of claim 22, wherein said user input means for manipulating said data allows updating of said data.

24. The system of claim 16, wherein said script commands include client-side validation rules defined for the control object.

25. The system of claim 16, wherein said database comprises a set of database tables residing on a server.

26. The system of claim 25, wherein said information being retrieved comprises database rows selected from said set of database tables.

27. The system of claim 16, wherein program logic for generating hypertext, markup language and script commands for rendering the control object at the end user's browser operates automatically without coding by the developer user.

* * * * *